(12) United States Patent
Kusabe et al.

(10) Patent No.: US 12,024,023 B2
(45) Date of Patent: Jul. 2, 2024

(54) VEHICLE DRIVE DEVICE

(71) Applicant: AISIN CORPORATION, Aichi (JP)

(72) Inventors: Keiichirou Kusabe, Kariya (JP); Kohei Tsuda, Kariya (JP); Bumpei Nakaya, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/272,701

(22) PCT Filed: Mar. 9, 2022

(86) PCT No.: PCT/JP2022/010168
§ 371 (c)(1),
(2) Date: Jul. 17, 2023

(87) PCT Pub. No.: WO2022/209650
PCT Pub. Date: Oct. 6, 2022

(65) Prior Publication Data
US 2024/0083238 A1 Mar. 14, 2024

(30) Foreign Application Priority Data
Mar. 30, 2021 (JP) ................................. 2021-057257

(51) Int. Cl.
*B60K 6/52* (2007.10)
*B60K 6/387* (2007.10)
*B60K 6/48* (2007.10)

(52) U.S. Cl.
CPC ............... *B60K 6/52* (2013.01); *B60K 6/387* (2013.01); *B60K 6/48* (2013.01)

(58) Field of Classification Search
CPC . B60K 6/52; B60K 6/387; B60K 6/48; B60K 1/02; B60K 17/04
See application file for complete search history.

(56) References Cited

U.S. PATENT DOCUMENTS

| 8,083,016 B2 * | 12/2011 | Naik | B60K 6/52 |
| | | | 475/5 |
| 8,632,438 B2 * | 1/2014 | Kuroda | B60K 6/48 |
| | | | 477/5 |

(Continued)

FOREIGN PATENT DOCUMENTS

JP 2020-525358 A 8/2020

OTHER PUBLICATIONS

International Search Report of PCT/JP2022/010168 dated May 17, 2022 [PCT/ISA/210].

*Primary Examiner* — Jacob S. Scott
*Assistant Examiner* — Farhana Pervin
(74) *Attorney, Agent, or Firm* — Sughrue Mion, PLLC

(57) ABSTRACT

A control device that controls an internal combustion engine, a first rotary electric machine, a first engagement device, and a second engagement device performing first transition control when transition is performed from a first mode to a second mode. The first transition control includes first control, second control, and third control. The first control is control in which the second engagement device that connects and disconnects power transmission between two rotary elements selected from among three rotary elements of a distribution differential gear mechanism is changed from an engaged state to a disengaged state while a third engagement device of a transmission mechanism is maintained in an engaged state. The second control controls a rotational speed of the first rotary element to is changed from a disengaged state to an engaged state and the internal combustion engine is started by using drive power transmitted from the first rotary electric.

5 Claims, 14 Drawing Sheets

(56) References Cited

U.S. PATENT DOCUMENTS

| | | | | |
|---|---|---|---|---|
| 8,672,804 B2* | 3/2014 | Okubo | ................... | B60K 6/387 |
| | | | | 477/5 |
| 8,684,884 B2* | 4/2014 | Kato | .................... | B60W 20/00 |
| | | | | 477/3 |
| 9,481,235 B1* | 11/2016 | Banshoya | ............ | B60W 10/115 |
| 10,227,068 B2* | 3/2019 | Takagi | .................. | B60K 6/445 |
| 10,940,750 B2* | 3/2021 | Pan | ....................... | B60K 6/445 |
| 11,458,952 B2* | 10/2022 | Okuda | ............ | B60W 30/18172 |
| 11,498,406 B2* | 11/2022 | Nabeshima | ............ | B60K 6/448 |
| 2013/0184920 A1* | 7/2013 | Otsubo | ............... | B60W 10/101 |
| | | | | 180/65.265 |
| 2017/0167546 A1* | 6/2017 | Satoi | ....................... | F16D 21/06 |
| 2019/0225070 A1* | 7/2019 | Gassmann | ............ | B60K 6/547 |
| 2021/0146767 A1 | 5/2021 | Gassmann | | |
| 2021/0260982 A1* | 8/2021 | Akiyama | ................. | B60K 6/52 |

\* cited by examiner

FIG. 4
|  | CL1 | CL2 | CL3 |
|---|---|---|---|
| eTC mode | ○ | × | Lo |
| First EV mode | × | ○ | Lo |
| Second EV mode | × | ○ | Hi |
| First HV mode | ○ | ○ | Lo |
| Second HV mode | ○ | ○ | Hi |
| Charge mode | ○ | ○ | N |
FIG. 5
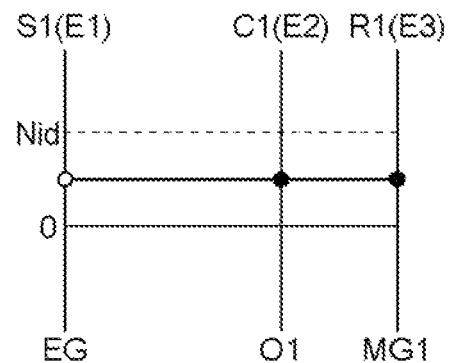
FIG. 6
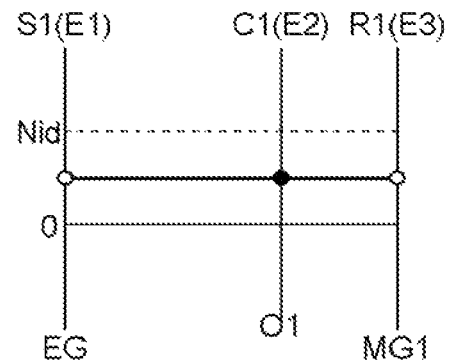

VEHICLE DRIVE DEVICE

CROSS REFERENCE TO RELATED APPLICATIONS

This application is a National Stage of International Application No. PCT/JP2022/010168, filed Mar. 9, 2022, claiming priority to Japanese Patent Application No. 2021-057257, filed May 30, 2021, the entire contents of which are incorporated herein by reference.

TECHNICAL FIELD

The present disclosure relates to a vehicle drive device including an input member drivingly coupled to an internal combustion engine, an output member drivingly coupled to a wheel, a rotary electric machine, and a distribution differential gear mechanism.

BACKGROUND ART

An example of such a vehicle drive device is disclosed in Patent Literature 1 below. In the following description of the "BACKGROUND ART" section and the "TECHNICAL PROBLEMS" section, the reference signs in Patent Literature 1 are quoted in parentheses.

A vehicle drive device of Patent Literature 1 includes: an input member (8) drivingly coupled to an internal combustion engine (3); an output member (7) drivingly coupled to a wheel; a rotary electric machine (4); a distribution differential gear mechanism (10) including a first rotary element (13) drivingly coupled to the input member (8), a second rotary element (12) drivingly coupled to the output member (7), and a third rotary element (11) drivingly coupled to the rotary electric machine (4); a transmission mechanism (19) that performs power transmission between the second rotary element (12) and the output member (7); a first engagement device (17) that connects and disconnects power transmission between the internal combustion engine (3) and the first rotary element (13); and a second engagement device (16) that connects and disconnects power transmission between the first rotary element (13) and the third rotary element (11). In addition, the transmission mechanism (19) includes third engagement devices (23, 24) that connect and disconnect the power transmission between the second rotary element (12) and the output member (7).

Further, the vehicle drive device of Patent Literature 1 has a first mode (EM) and a second mode (CVTM) as operation modes thereof. In the first mode (EM), the first engagement device (17) is brought into a disengaged state, the second engagement device (16) is brought into an engaged state, the third engagement devices (23, 24) are brought into engaged states, and the internal combustion engine (3) is brought into a stopped state of not outputting drive power, whereby drive power of the rotary electric machine (4) is transmitted to the output member (7). In the second mode (CVTM), the first engagement device (17) is brought into an engaged state, the second engagement device (16) is brought into a disengaged state, and the third engagement devices (23, 24) are brought into engaged states, whereby drive power of the internal combustion engine (3) and the rotary electric machine (4) is transmitted to the output member (7).

CITATIONS LIST

Patent Literature

Patent Literature 1: JP 2020-525358 A

SUMMARY OF THE DISCLOSURE

Technical Problems

As described above, the internal combustion engine (3) is brought into a stopped state in the first mode (EM), and the internal combustion engine (3) is brought into a driven state in the second mode (CVTM). Thus, when transition is performed from the first mode (EM) to the second mode (CVTM), it is necessary to start the internal combustion engine (3). In the vehicle drive device of Patent Literature 1, one of a first start control and a second start control is performed when the internal combustion engine (3) is started. The first start control is control in which the internal combustion engine (3) is started while the first engagement device (17) and the second engagement device (16) are in respective engaged states and the third engagement devices (23, 24) are in respective disengaged states. The second start control is control in which the internal combustion engine (3) is started while the first engagement device (17), the second engagement device (16), and the third engagement devices (23, 24) are in respective engaged states.

In Patent Literature 1, there may be, however, no mention of how to start the internal combustion engine (3) when the transition is performed from the first mode (EM) to the second mode (CVTM). If the internal combustion engine (3) is started by the first start control described above when the transition is performed from the first mode (EM) to the second mode (CVTM), it is necessary to once change the third engagement devices (23, 24) from engaged states to disengaged states and then start the internal combustion engine (3), and subsequently return the third engagement devices (23, 24) to engaged states, in order to start the internal combustion engine (3). As a result, the number of times of changing the states of the engagement devices increases, and the time required for the transition of the operation modes tends to be longer. Further, when transition is performed from the first mode (EM) to the second mode (CVTM) and the internal combustion engine (3) is started by the second start control, the rotational speed of the first rotary element (13) needs to be set to a rotational speed required for starting the internal combustion engine (3). Thus, it is necessary to wait for the transition of the operation modes until the rotational speed of the first rotary element (13) reaches the rotational speed required for starting the internal combustion engine (3), and the time required for the transition of the operation modes tends to be longer.

Therefore, it is desired to provide a vehicle drive device that can reduce a time required for transition of operation modes accompanying a start of an internal combustion engine.

Solutions to Problems

As a characteristic configuration in view of the above, a vehicle drive device includes:
  an input member drivingly coupled to an internal combustion engine;
  a first output member drivingly coupled to a first wheel;
  a first rotary electric machine including a rotor;
  a distribution differential gear mechanism including a first rotary element, a second rotary element, and a third rotary element, the first rotary element being drivingly coupled to the input member, the third rotary element being drivingly coupled to the rotor;

a transmission mechanism that performs at least power transmission between the second rotary element and the first output member;

a first engagement device that connects and disconnects power transmission between the input member and the first rotary element;

a second engagement device that connects and disconnects power transmission between two rotary elements selected from among three rotary elements that are the first rotary element, the second rotary element, and the third rotary element; and a control device that controls the internal combustion engine, the first rotary electric machine, the first engagement device, and the second engagement device, the transmission mechanism including a third engagement device that connects and disconnects the power transmission between the second rotary element and the first output member, in which the vehicle drive device has a first mode and a second mode as operation modes, in the first mode, the first engagement device is brought into a disengaged state, the second engagement device is brought into an engaged state, the third engagement device is brought into an engaged state, and the internal combustion engine is brought into a stopped state of not outputting drive power, and drive power of the first rotary electric machine is transmitted to the first output member, in the second mode, the first engagement device is brought into an engaged state, the second engagement device is brought into a disengaged state, and the third engagement device is brought into an engaged state, and drive power of the internal combustion engine and the first rotary electric machine is transmitted to the first output member, the control device is allowed to perform first transition control when transition to the second mode from the first mode is performed, and the first transition control includes:

first control in which the second engagement device is changed from an engaged state to a disengaged state while the third engagement device is maintained in an engaged state;

second control in which, after the first control, a rotational speed of the rotor is controlled to cause a rotational speed of the first rotary element to approach a target rotational speed; and third control in which, after the second control, the first engagement device is changed from a disengaged state to an engaged state and the internal combustion engine is started by using drive power transmitted from the first rotary electric machine to the internal combustion engine via the first engagement device.

According to this characteristic configuration, the relationship among the rotational speeds of the three rotary elements of the distribution differential gear mechanism can be freely changed by bringing the second engagement device into a disengaged state, and utilizing this allows the rotational speed of the first rotary element of the distribution differential gear mechanism to easily approach the target rotational speed by performing the rotational speed control of the first rotary electric machine, without bringing the third engagement device into a disengaged state. As a result, the rotational speed of the first rotary element can be easily changed to a rotational speed required for starting the internal combustion engine. In addition, after the rotational speed of the first rotary element is caused to approach the target rotational speed, bringing the first engagement device into an engaged state allows a state in which the drive power of the first rotary electric machine is transmittable to the internal combustion engine, whereby the internal combustion engine can be started by using the drive power of the first rotary electric machine. After the start of the internal combustion engine, the first engagement device is in an engaged state, the second engagement device is in a disengaged state, and the third engagement device is in an engaged state. Thus, the second mode can be started without changing the states of the engagement devices. Therefore, according to this characteristic configuration, it is possible to reduce a time required for the transition from the first mode to the second mode, that is, the transition of the operation modes accompanying the start of the internal combustion engine.

BRIEF DESCRIPTION OF DRAWINGS

FIG. 4 is a diagram showing states of engagement devices in each operation mode of the vehicle drive device according to the first embodiment.

FIG. 5 is a speed diagram of a distribution differential gear mechanism in first transition control according to the first embodiment.

FIG. 6 is a speed diagram of the distribution differential gear mechanism in the first transition control according to the first embodiment.

DESCRIPTION OF EMBODIMENTS

1. First Embodiment

Figure 1:
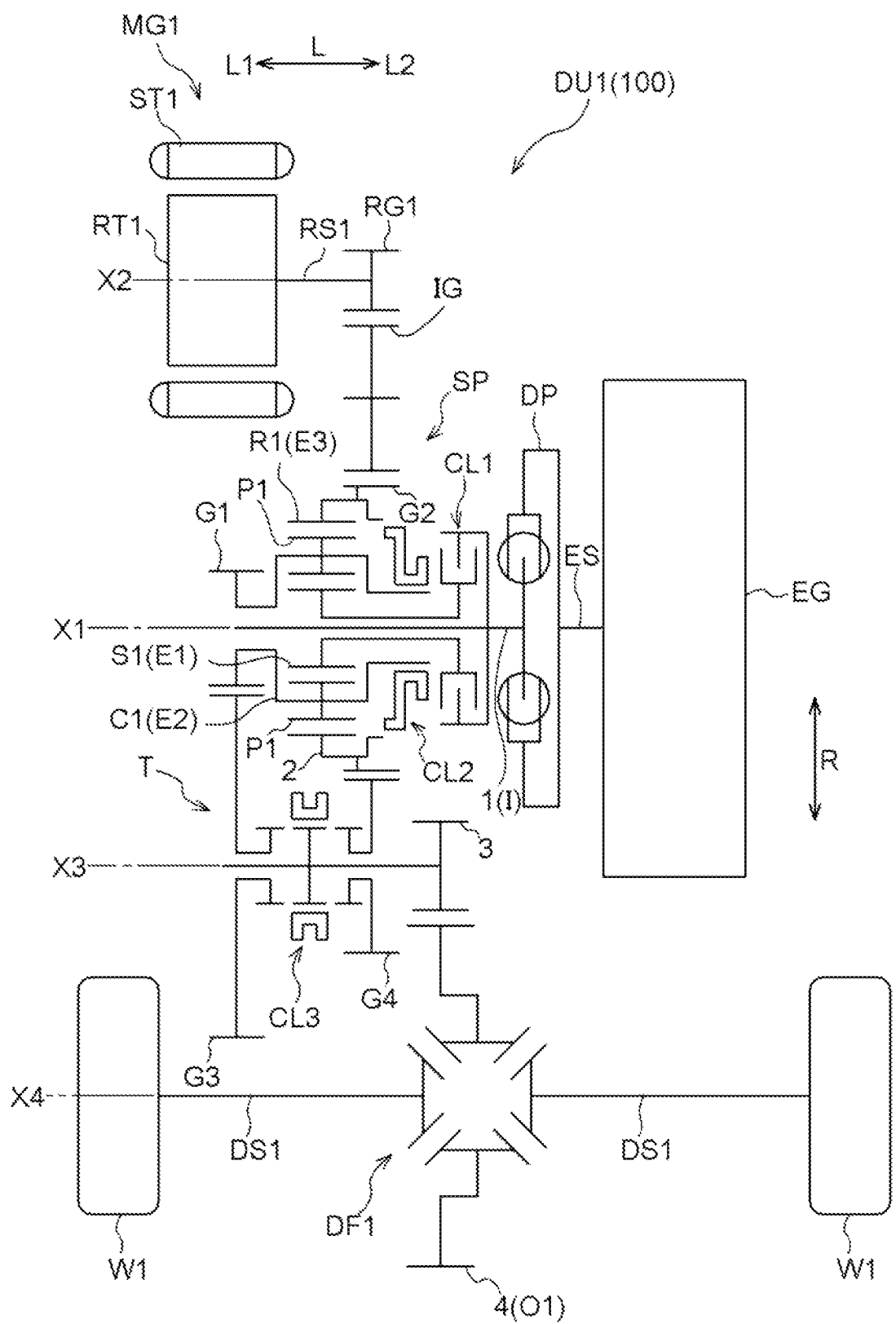
FIG. 1 is a skeleton diagram of a first drive unit of a vehicle drive device according to a first embodiment.

Hereinafter, a vehicle drive device 100 according to a first embodiment will be described with reference to the drawings. As shown in FIG. 1, in the present embodiment, the vehicle drive device 100 includes a first drive unit DU1 that drives a pair of first wheels W1 and a second drive unit DU2 that drives a pair of second wheels W2. In the present embodiment, the first wheels W1 are front wheels of a vehicle, and the second wheels W2 are rear wheels of the vehicle.

The first drive unit DU1 includes an input member I that is drivingly coupled to an internal combustion engine EG, a first output member O1 that is drivingly coupled to the first wheels W1, a first rotary electric machine MG1 that includes a first stator ST1 and a first rotor RT1, a distribution differential gear mechanism SP, a first engagement device CL1, a second engagement device CL2, and a transmission mechanism T that includes a third engagement device CL3. In the present embodiment, the first drive unit DU1 further includes a first output differential gear mechanism DF1.

As used herein, the expression "drivingly coupled" refers to a state in which two rotary elements are coupled to be able to transmit drive power, and includes a state in which the two rotary elements are coupled to rotate together or a state in which the two rotary elements are coupled to be able to transmit drive power via one, or two or more transmission members. Examples of such a transmission member include various members that transmit rotation at the same speed or at a changed speed, such as a shaft, a gear mechanism, a belt, and a chain. Note that the transmission member may include an engagement device that selectively transmits rotation and drive power, such as a friction engagement device or a meshing-type engagement device. However, when the expression "drivingly coupled" is used for each rotary element of a planetary gear mechanism, the expression "drivingly coupled" refers to a state in which a plurality of rotary elements in the planetary gear mechanism are coupled to each other not via any other rotary element therebetween.

In the present embodiment, the input member I, the distribution differential gear mechanism SP, the first engagement device CL1, and the second engagement device CL2 are disposed on a first axis X1 serving as the rotational axis thereof. In addition, the first rotary electric machine MG1 is disposed on a second axis X2 serving as the rotational axis thereof. Further, the third engagement device CL3 of the transmission mechanism T is disposed on a third axis X3 serving as the rotational axis thereof. In addition, the first output member O1 and the first output differential gear mechanism DF1 are disposed on a fourth axis X4 serving as the rotational axis thereof.

In the present embodiment, the second drive unit DU2 includes a second rotary electric machine MG2 that includes a second stator ST2 and a second rotor RT2, a second output member O2 that is drivingly coupled to the second wheels W2, a counter gear mechanism CG, and a second output differential gear mechanism DF2.

In the present embodiment, the second rotary electric machine MG2 is disposed on a fifth axis X5 serving as the rotational axis thereof. In addition, the counter gear mechanism CG is disposed on a sixth axis X6 serving as the rotational axis thereof. Further, the second output member O2 and the second output differential gear mechanism DF2 are disposed on a seventh axis X7 serving as the rotational axis thereof.

In this example, the axes X1 to X7 are arranged in parallel to each other. In the following description, a direction parallel to the axes X1 to X7 is referred to as an "axial direction L" of the vehicle drive device 100. Moreover, one side in the axial direction L is referred to as an "axial first side L1", and the other side in the axial direction L is referred to as an "axial second side L2". In the present embodiment, the axial first side L1 is defined as a side on which the input member I is disposed with respect to the internal combustion engine EG, and the axial second side L2 is defined as the opposite side, in the axial direction L. In addition, a direction orthogonal to each of the axes X1 to X7 is defined as a "radial direction R" with reference to each axis. Note that, when it is not necessary to distinguish which axis is to be used as a reference axis, or when it is obvious which axis is to be used as a reference axis, it may be simply referred to as the "radial direction R".

In the present embodiment, the input member I is an input shaft 1 extending in the axial direction L. The input shaft 1 is drivingly coupled to an output shaft ES of the internal combustion engine EG via a damper device DP, which attenuates fluctuation in torque to be transmitted. The internal combustion engine EG is a prime mover (a gasoline engine, a diesel engine, or the like) that is driven by fuel combustion to take out power. In the present embodiment, the internal combustion engine EG functions as a drive power source for the first wheels W1.

The first rotary electric machine MG1 functions as a drive power source for the first wheels W1. The first rotary electric machine MG1 has a function as a motor (electric motor) that generates power by receiving supply of electric power, and a function as a generator (electric power generator) that generates electric power by receiving supply of power. Specifically, the first rotary electric machine MG1 is electrically connected to an electric storage device BT (see FIG. 3) such as a battery or a capacitor to exchange electric power with the electric storage device BT. Moreover, the first rotary electric machine MG1 generates drive power by performing power running with electric power stored in the electric storage device BT. Further, the first rotary electric machine MG1 generates electric power by using drive power of the internal combustion engine EG or drive power transmitted from the first output member O1 side, to charge the electric storage device BT.

The first stator ST1 of the first rotary electric machine MG1 is fixed to a non-rotary member (for example, a case that houses the first rotary electric machine MG1 and the like). The first rotor RT1 of the first rotary electric machine MG1 is rotatably supported by the first stator ST1. In the present embodiment, the first rotor RT1 is disposed on an inner side in the radial direction R of the first stator ST1.

In the present embodiment, a first rotor gear RG1 is coupled to the first rotor RT1 via a first rotor shaft RS1 formed to extend in the axial direction L such that the first rotor gear RG1 rotates together with the first rotor RT1. In the present embodiment, the first rotor gear RG1 is disposed on the second axis X2. In the example shown in FIG. 1, the first rotor gear RG1 is disposed on the axial second side L2 with respect to the first rotor RT1.

The distribution differential gear mechanism SP includes a first rotary element E1, a second rotary element E2, and a third rotary element E3. The first rotary element E1 is drivingly coupled to the input member I. The third rotary element E3 is drivingly coupled to the first rotor RT1. In the present embodiment, each of the second rotary element E2 and the third rotary element E3 is drivingly coupled to the first output member O1.

In the present embodiment, the distribution differential gear mechanism SP is a planetary gear mechanism including a sun gear S1, a carrier C1, and a ring gear R1. In this example, the distribution differential gear mechanism SP is a single-pinion-type planetary gear mechanism including the carrier C1 that supports a pinion gear P1, the sun gear S1 that meshes with the pinion gear P1, and the ring gear R1 that is disposed on an outer side in the radial direction R of the sun gear S1 and that meshes with the pinion gear P1.

In the present embodiment, the order of rotational speed of the rotary elements of the distribution differential gear mechanism SP is the first rotary element E1, the second rotary element E2, and the third rotary element E3. Thus, in the present embodiment, the first rotary element E1 is the sun gear S1. In addition, the second rotary element E2 is the carrier C1. Further, the third rotary element E3 is the ring gear R1.

Here, the expression "order of rotational speed" refers to the order of rotational speed of each rotary element in a rotating state. The rotational speed of each rotary element changes in accordance with the rotating state of the planetary gear mechanism, but the arrangement order based on highness and lowness of rotational speed of each rotary element is fixed because the arrangement order is determined by the structure of the planetary gear mechanism. Note that the order of rotational speed of the rotary elements is equal to the order of arrangement of the rotary elements in each of the speed diagrams (see FIG. 5 and the like). Here, the expression "order of arrangement of the rotary elements in each of the speed diagrams" refers to the order in which respective axes corresponding to the rotary elements in each of the speed diagrams are arranged in a direction orthogonal to the axes. The direction in which the respective axes corresponding to the rotary elements are arranged in each of the speed diagrams varies depending on how each of the speed diagrams is drawn, but the order of arrangement is fixed because the order of arrangement is determined by the structure of the planetary gear mechanism.

The transmission mechanism T is configured to perform at least power transmission between the second rotary element E2 of the distribution differential gear mechanism SP and the first output member O1. In the present embodiment, the transmission mechanism T selectively performs power transmission between the carrier C1 serving as the second rotary element E2 and the first output member O1, and power transmission between the ring gear R1 serving as the third rotary element E3 and the first output member O1, in accordance with the state of the third engagement device CL3.

In the present embodiment, the transmission mechanism T includes a first gear G1, a second gear G2, a third gear G3, a fourth gear G4, and a transmission output gear 3. In the present embodiment, the first gear G1 and the second gear G2 are disposed on the first axis X1. Moreover, the third gear G3, the fourth gear G4, and the transmission output gear 3 are disposed on the third axis X3.

The first gear G1 is coupled to the second rotary element E2 (here, the carrier C1) of the distribution differential gear mechanism SP to rotate together with the second rotary element E2. In the present embodiment, the first gear G1 is disposed on the axial first side L1 with respect to the distribution differential gear mechanism SP.

The second gear G2 is coupled to the third rotary element E3 (here, the ring gear R1) of the distribution differential gear mechanism SP to rotate together with the third rotary element E3. In the present embodiment, a cylindrical gear forming member 2 whose axis is the first axis X1 is provided. Moreover, the second gear G2 is formed on an outer circumferential surface of the gear forming member 2, and the ring gear R1 is formed on an inner circumferential surface of the gear forming member 2. Further, in the present embodiment, the second gear G2 is disposed at a position that is on an outer side in the radial direction R of the ring gear R1 and at which the second gear G2 overlaps the distribution differential gear mechanism SP as viewed in the radial direction along the radial direction R. Here, with respect to arrangement of two elements, the expression "to overlap as viewed in a specific direction" means that when an imaginary straight line parallel to the direction of the view is moved in each direction orthogonal to the imaginary straight line, a region where the imaginary straight line intersects both of the two elements exists at least in part.

Further, in the present embodiment, the second gear G2 is drivingly coupled to the first rotor gear RG1 via an idler gear IG disposed on an axis different from each of the first axis X1 to the fourth axis X4. That is, in the present embodiment, the second gear G2 and the first rotor gear RG1 mesh with the idler gear IG at different respective positions in a circumferential direction of the idler gear IG. As a result, the second gear G2 and the first rotor gear RG1 are coupled to rotate in conjunction with each other via the idler gear IG.

The third gear G3 and the fourth gear G4 are supported to be rotatable relative to each other. The third gear G3 meshes with the first gear G1. The fourth gear G4 meshes with the second gear G2. In the present embodiment, the fourth gear G4 meshes with the second gear G2 at a position different from a position at which the idler gear IG meshes with the second gear G2, in a circumferential direction of the second gear G2. The transmission output gear 3 is supported to be rotatable relative to each of the third gear G3 and the fourth gear G4.

The number of teeth of the first gear G1 is different from the number of teeth of the second gear G2. That is, the outside diameter of the first gear G1 is different from the outside diameter of the second gear G2. In addition, as described above, the first gear G1 and the second gear G2 are disposed on the same axis, and the third gear G3 meshing with the first gear G1 and the fourth gear G4 meshing with the second gear G2 are disposed on the same axis. Thus, when the outside diameter of the first gear G1 is smaller than the outside diameter of the second gear G2, the outside diameter of the third gear G3 is larger than the outside diameter of the fourth gear G4. In contrast, when the outside diameter of the first gear G1 is larger than the outside diameter of the second gear G2, the outside diameter of the third gear G3 is smaller than the outside diameter of the fourth gear G4. Therefore, a ratio of the number of teeth of the third gear G3 to the number of teeth of the first gear G1 is different from a ratio of the number of teeth of the fourth gear G4 to the number of teeth of the second gear G2. In the present embodiment, the outside diameter of the first gear G1 is smaller than the outside diameter of the second gear G2, and the number of teeth of the first gear G1 is smaller than the number of teeth of the second gear G2. Thus, in the present embodiment, the outside diameter of the third gear G3 is larger than the outside diameter of the fourth gear G4, and the number of teeth of the third gear G3 is larger than the number of teeth of the fourth gear G4. Therefore, in the present embodiment, the ratio of the number of teeth of the third gear G3 to the number of teeth of the first gear G1 is larger than the ratio of the number of teeth of the fourth gear G4 to the number of teeth of the second gear G2.

The third engagement device CL3 of the transmission mechanism T is an engagement device that connects and disconnects power transmission between the second rotary element E2 of the distribution differential gear mechanism SP and the first output member O1. In the present embodiment, the third engagement device CL3 is configured to selectively couple one of the third gear G3 and the fourth gear G4 to the transmission output gear 3.

As described above, in the present embodiment, the ratio of the number of teeth of the third gear G3 to the number of teeth of the first gear G1 is larger than the ratio of the number of teeth of the fourth gear G4 to the number of teeth of the second gear G2. Thus, when the third engagement device CL3 causes the third gear G3 to be coupled to the transmission output gear 3, a first shift speed (low speed) having a relatively larger transmission gear ratio is formed. On the other hand, when the third engagement device CL3 causes the fourth gear G4 to be coupled to the transmission output gear 3, a second shift speed (high speed) having a relatively smaller transmission gear ratio is formed.

Further, in the present embodiment, the third engagement device CL3 is configured to be switchable to a neutral state in which no shift speed is formed. When the third engagement device CL3 is in the neutral state, the transmission mechanism T is brought into a state where the transmission mechanism T does not transmit rotation transmitted from the distribution differential gear mechanism SP to the first output member O1, that is, a state where neither drive power from the internal combustion engine EG nor drive power from the first rotary electric machine MG1 is transmitted to the first wheels W1.

Note that a state in which the third engagement device CL3 forms any shift speed corresponds to an engaged state of the third engagement device CL3. In contrast, the neutral state of the third engagement device CL3 corresponds to a disengaged state of the third engagement device CL3. In this example, the third engagement device CL3 is a meshing-type engagement device (dog clutch) configured to be switchable between an engaged state and a disengaged state by using an actuator such as a solenoid, an electric motor, or a hydraulic cylinder.

As described above, in the present embodiment, the transmission mechanism T is configured as a parallel-axis-gear-type transmission including the first gear G1 and the second gear G2 disposed on the same axis, and the third gear G3 and the fourth gear G4 respectively meshing with the first gear G1 and the second gear G2 and disposed on the same axis.

The first output differential gear mechanism DF1 is configured to distribute rotation of the first output member O1 to the pair of first wheels W1. In the present embodiment, the first output member O1 is a first differential input gear 4 that meshes with the transmission output gear 3.

In the present embodiment, the first output differential gear mechanism DF1 is a bevel-gear-type differential gear mechanism. Specifically, the first output differential gear mechanism DF1 includes a hollow first differential case, a first pinion shaft that is supported to rotate together with the first differential case, a pair of first pinion gears that are rotatably supported by the first pinion shaft, and a pair of first side gears that mesh with the pair of first pinion gears to function as distribution output elements. The first differential case houses the first pinion shaft, the pair of first pinion gears, and the pair of first side gears.

In the present embodiment, the first differential input gear 4 serving as the first output member O1 is coupled to the first differential case to protrude outward in the radial direction R from the first differential case. In addition, respective first drive shafts DS1 drivingly coupled to the first wheels W1 are coupled to the pair of first side gears such that the first drive shafts DS1 and the pair of first side gears can rotate together. Thus, in the present embodiment, the first output differential gear mechanism DF1 distributes the rotation of the first output member O1 (here, the first differential input gear 4) to the pair of first wheels W1 via the pair of first drive shafts DS1.

The first engagement device CL1 is an engagement device that connects and disconnects power transmission between the input member I and the first rotary element E1 of the distribution differential gear mechanism SP. In the present embodiment, the first engagement device CL1 is configured to connect and disconnect power transmission between the input member I and the sun gear S1. In the example shown in FIG. 1, the first engagement device CL1 is disposed on the axial second side L2 with respect to the distribution differential gear mechanism SP.

In the present embodiment, the first engagement device CL1 is a friction engagement device that includes an input element that is a rotary element on the input member I side and an output element that is a rotary element on the distribution differential gear mechanism SP side, and in which a state of engagement (an engaged state or a disengaged state) is controlled in accordance with an engagement pressure thereof. That is, in the present embodiment, the first engagement device CL1 is a friction engagement device including a direct-coupling engaged state and a slip engaged state as engaged states. Note that the "direct-coupling engaged state" is an engaged state in which there is no difference in rotational speed between an input element and an output element of a friction engagement device. Moreover, the "slip engaged state" is an engaged state in which there is a difference in rotational speed between an input element and an output element of a friction engagement device.

The second engagement device CL2 is an engagement device that connects and disconnects power transmission between two rotary elements selected from among the three rotary elements, which are the first rotary element E1, the second rotary element E2, and the third rotary element E3, in the distribution differential gear mechanism SP. In the present embodiment, the second engagement device CL2 is configured to connect and disconnect power transmission between the carrier C1 serving as the second rotary element E2 and the ring gear R1 serving as the third rotary element E3. In the example shown in FIG. 1, the second engagement device CL2 is disposed between the first engagement device CL1 and the distribution differential gear mechanism SP in the axial direction L. In this example, the second engagement device CL2 is a meshing-type engagement device (dog clutch) configured to be switchable between an engaged state and a disengaged state by using an actuator such as a solenoid, an electric motor, or a hydraulic cylinder.

Figure 2:
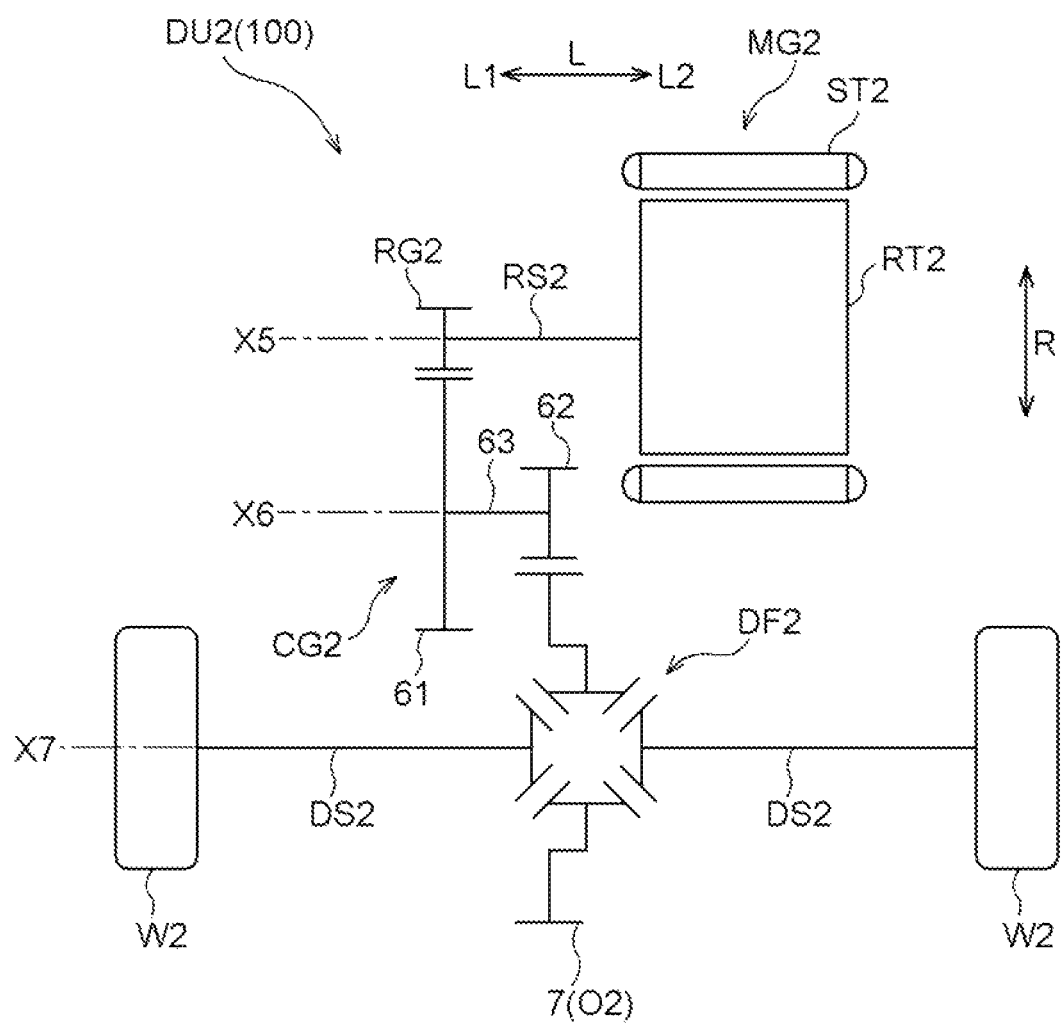
FIG. 2 is a skeleton diagram of a second drive unit of the vehicle drive device according to the first embodiment.

As shown in FIG. 2, the second rotary electric machine MG2 functions as a drive power source for the second wheels W2. The second rotary electric machine MG2 has a function as a motor (electric motor) that generates power by receiving supply of electric power, and a function as a generator (electric power generator) that generates electric power by receiving supply of power. Specifically, the second rotary electric machine MG2 is electrically connected to the electric storage device BT (see FIG. 3) to exchange electric power with the electric storage device BT. Moreover, the second rotary electric machine MG2 generates drive power by performing power running with electric power stored in the electric storage device BT. Further, during regeneration, the second rotary electric machine MG2 generates electric power by using drive power transmitted from the second output member O2 side, to charge the electric storage device BT.

The second stator ST2 of the second rotary electric machine MG2 is fixed to a non-rotary member (for example, a case that houses the second rotary electric machine MG2 and the like). The second rotor RT2 of the second rotary electric machine MG2 is rotatably supported by the second stator ST2. In the present embodiment, the second rotor RT2 is disposed on an inner side in the radial direction R of the second stator ST2.

In the present embodiment, a second rotor gear RG2 is coupled to the second rotor RT2 via a second rotor shaft RS2 formed to extend in the axial direction L such that the second rotor gear RG2 rotates together with the second rotor RT2. In the present embodiment, the second rotor gear RG2 is disposed on the fifth axis X5. In the example shown in FIG. 2, the second rotor gear RG2 is disposed on the axial first side L1 with respect to the second rotor RT2.

The counter gear mechanism CG includes a counter input gear 61, a counter output gear 62, and a counter shaft 63 that couples these gears 61, 62 to allow the gears 61, 62 to rotate together.

The counter input gear 61 is an input element of the counter gear mechanism CG. In the present embodiment, the counter input gear 61 meshes with the second rotor gear RG2. The counter output gear 62 is an output element of the counter gear mechanism CG. In the example shown in FIG. 2, the counter output gear 62 is disposed on the axial second side L2 with respect to the counter input gear 61. In addition, the counter output gear 62 is formed to have a diameter smaller than the diameter of the counter input gear 61.

The second output differential gear mechanism DF2 is configured to distribute rotation of the second output member O2 to the pair of second wheels W2. In the present embodiment, the second output member O2 is a second differential input gear 7 that meshes with the counter output gear 62 of the counter gear mechanism CG.

In the present embodiment, the second output differential gear mechanism DF2 is a bevel-gear-type differential gear mechanism. Specifically, the second output differential gear mechanism DF2 includes a hollow second differential case, a second pinion shaft that is supported to rotate together with the second differential case, a pair of second pinion gears that are rotatably supported by the second pinion shaft, and a pair of second side gears that mesh with the pair of second pinion gears to function as distribution output elements. The second differential case houses the second pinion shaft, the pair of second pinion gears, and the pair of second side gears.

In the present embodiment, the second differential input gear 7 serving as the second output member O2 is coupled to the second differential case to protrude outward in the radial direction R from the second differential case. In addition, respective second drive shafts DS2 drivingly coupled to the second wheels W2 are coupled to the pair of second side gears such that the second drive shafts DS2 and the pair of second side gears can rotate together. Thus, in the present embodiment, the second output differential gear mechanism DF2 distributes the rotation of the second output member O2 (here, the second differential input gear 7) to the pair of second wheels W2 via the pair of second drive shafts DS2.

Figure 3:
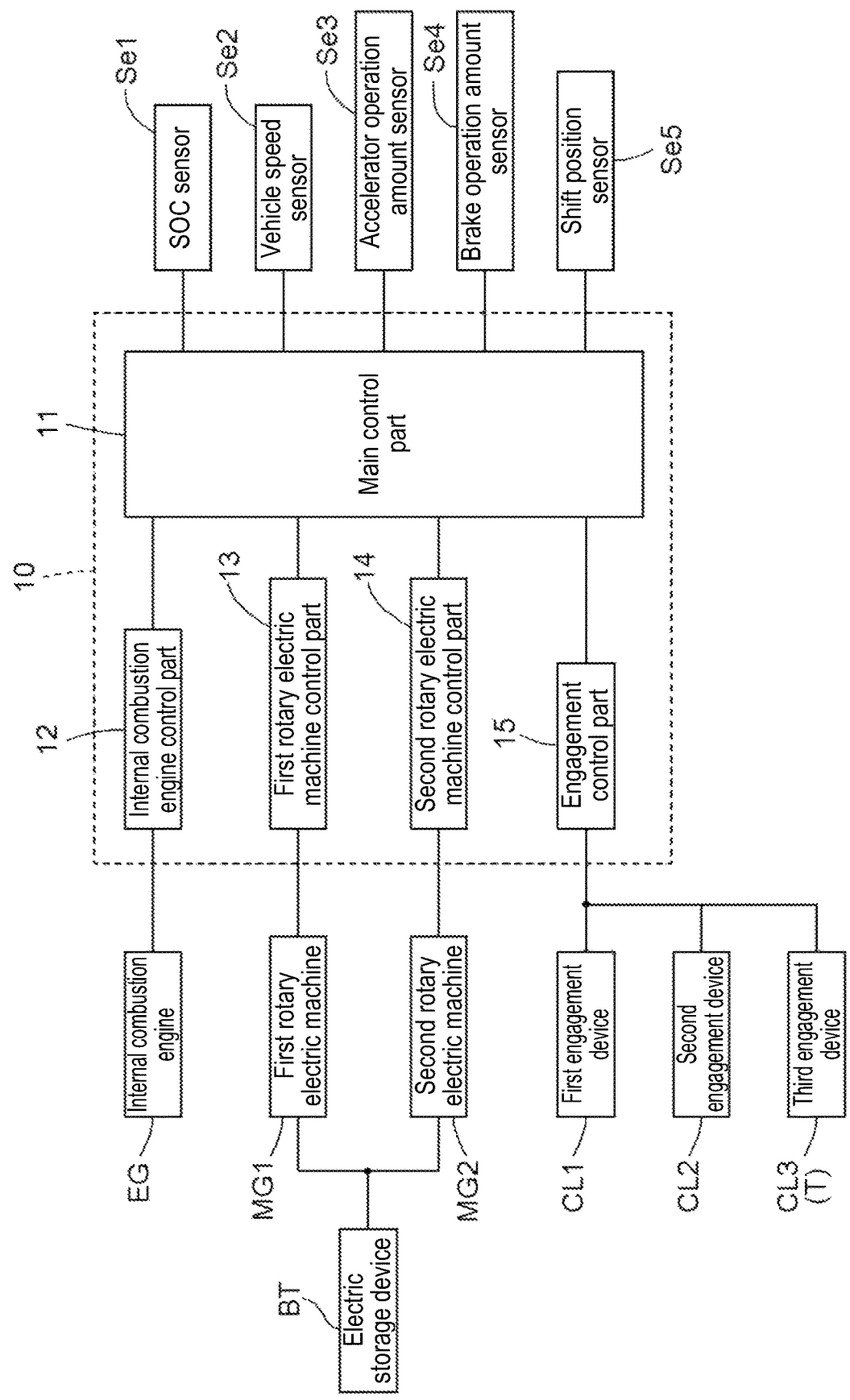
FIG. 3 is a control block diagram of the vehicle drive device according to the first embodiment.

As shown in FIG. 3, the vehicle drive device 100 includes a control device 10 that controls the internal combustion engine EG, the first rotary electric machine MG1, the first engagement device CL1, and the second engagement device CL2. In the present embodiment, the control device 10 includes a main control part 11, an internal combustion engine control part 12 that controls the internal combustion engine EG, a first rotary electric machine control part 13 that controls the first rotary electric machine MG1, a second rotary electric machine control part 14 that controls the second rotary electric machine MG2, and an engagement control part 15 that controls a state of engagement of each of the first engagement device CL1, the second engagement device CL2, and the third engagement device CL3.

The main control part 11 outputs, to each of the internal combustion engine control part 12, the first rotary electric machine control part 13, the second rotary electric machine control part 14, and the engagement control part 15, a corresponding one of commands for controlling the respective devices handled by the control parts. The internal combustion engine control part 12 controls the internal combustion engine EG such that the internal combustion engine EG outputs command torque commanded by the main control part 11 or achieves a command rotational speed commanded by the main control part 11. The first rotary electric machine control part 13 controls the first rotary electric machine MG1 such that the first rotary electric machine MG1 outputs command torque commanded by the main control part 11 or achieves a command rotational speed commanded by the main control part 11. The second rotary electric machine control part 14 controls the second rotary electric machine MG2 such that the second rotary electric machine MG2 outputs command torque commanded by the main control part 11 or achieves a command rotational speed commanded by the main control part 11. The engagement control part 15 controls actuators (not shown) for operating the first engagement device CL1, the second engagement device CL2, and the third engagement device CL3 such that each of the first engagement device CL1, the second engagement device CL2, and the third engagement device CL3 is brought into a state of engagement commanded by the main control part 11.

Further, the main control part 11 is configured to be able to acquire information from sensors provided in parts of a vehicle on which the vehicle drive device 100 is mounted, in order to acquire information of the parts of the vehicle. In the present embodiment, the main control part 11 is configured to be able to acquire information from an SOC sensor Se1, a vehicle speed sensor Se2, an accelerator operation amount sensor Se3, a brake operation amount sensor Se4, and a shift position sensor Se5.

The SOC sensor Se1 is a sensor for detecting a state of the electric storage device BT electrically connected to the first rotary electric machine MG1 and the second rotary electric machine MG2. The SOC sensor Se1 includes, for example, a voltage sensor, a current sensor, and the like. The main control part 11 calculates a state of charge (SOC) of the electric storage device BT based on information such as a voltage value and a current value output from the SOC sensor Se1.

The vehicle speed sensor Se2 is a sensor for detecting a travel speed of the vehicle (vehicle speed) on which the vehicle drive device 100 is mounted. In the present embodiment, the vehicle speed sensor Se2 is a sensor for detecting a rotational speed of the first output member O1. The main control part 11 calculates the rotational speed (angular velocity) of the first output member O1 based on a detection signal of the vehicle speed sensor Se2. The rotational speed of the first output member O1 is proportional to the vehicle speed, and thus the main control part 11 can calculate the vehicle speed based on the detection signal of the vehicle speed sensor Se2.

The accelerator operation amount sensor Se3 is a sensor for detecting an operation amount of an accelerator pedal (accelerator opening degree) generated by a driver operating the accelerator pedal provided in the vehicle on which the vehicle drive device 100 is mounted. The main control part 11 calculates the accelerator opening degree based on a detection signal of the accelerator operation amount sensor Se3.

The brake operation amount sensor Se4 is a sensor for detecting an operation amount of a brake pedal generated by the driver operating the brake pedal provided in the vehicle on which the vehicle drive device 100 is mounted. The main control part 11 calculates the operation amount of the brake pedal generated by the driver based on a detection signal of the brake operation amount sensor Se4.

The shift position sensor Se5 is a sensor for detecting a selected position of a shift lever (shift position) operated by the driver of the vehicle on which the vehicle drive device 100 is mounted. The main control part 11 calculates the shift position based on a detection signal of the shift position sensor Se5. The shift lever is configured to be able to select a parking range (P-range), a reverse travel range (R-range), a neutral range (N-range), a forward travel range (D-range), and the like.

The main control part 11 performs selection of a plurality of operation modes in the first drive unit DU1, which will be described later, based on the information from the sensors Se1 to Se5 described above. The main control part 11 performs transition to a selected operation mode by controlling, through the engagement control part 15, each of the first engagement device CL1, the second engagement device CL2, and the third engagement device CL3 to a state of engagement in accordance with the selected operation mode. Further, the main control part 11 allows appropriate travel of the vehicle in accordance with the selected operation mode by performing cooperative control on operation states of the internal combustion engine EG, the first rotary electric machine MG1, and the second rotary electric machine MG2, through the internal combustion engine control part 12, the first rotary electric machine control part 13, and the second rotary electric machine control part 14.

As shown in FIG. 4, in the present embodiment, the vehicle drive device 100 has, as operation modes, an electric torque converter mode (hereinafter, referred to as an "eTC mode"), a first EV mode, a second EV mode, a first HV mode, a second HV mode, and a charge mode.

FIG. 4 shows states of the first engagement device CL1, the second engagement device CL2, and the third engagement device CL3 in each operation mode according to the present embodiment. Note that, in the fields for the first engagement device CL1 and the second engagement device CL2 in FIG. 4, "O" indicates that a target engagement device is in an engaged state, and "X" indicates that a target engagement device is in a disengaged state. Further, in the fields for the third engagement device CL3 in FIG. 4, "Lo" indicates that the third engagement device CL3 is in a state of forming the first shift speed (low speed), "Hi" indicates that the third engagement device CL3 is in a state of forming the second shift speed (high speed), and "N" indicates that the third engagement device CL3 is in a neutral state.

The eTC mode is a mode in which the vehicle is caused to travel by transmitting, to the first output member O1, amplified torque generated by amplifying the torque of the internal combustion engine EG using the torque of the first rotary electric machine MG1 as a reaction force, through the distribution differential gear mechanism SP. The eTC mode is referred to as a so-called electric torque converter mode because the torque of the internal combustion engine EG can be amplified to be transmitted to the first output member O1.

As shown in FIG. 4, in the eTC mode, the first engagement device CL1 is brought into an engaged state, the second engagement device CL2 is brought into a disengaged state, and the third engagement device CL3 is brought into an engaged state. Then, drive power of the internal combustion engine EG and the first rotary electric machine MG1 is transmitted to the first output member O1. In the eTC mode of the present embodiment, the first engagement device CL1 is controlled to be in an engaged state, the second engagement device CL2 is controlled to be in a disengaged state, and the third engagement device CL3 is controlled to be in a state of forming the first shift speed (low speed). The eTC mode corresponds to a "second mode".

In the eTC mode of the present embodiment, the first rotary electric machine MG1 outputs positive torque while negatively rotating to generate electric power, and the distribution differential gear mechanism SP combines drive power of the first rotary electric machine MG1 and drive power of the internal combustion engine EG to output drive power larger than the drive power of the internal combustion engine EG from the second rotary element E2 (here, the carrier C1). Then, the rotation of the second rotary element E2 is subjected to speed change at a transmission gear ratio in accordance with the first shift speed (low speed) in the transmission mechanism T, and is transmitted to the first output member O1. Thus, the eTC mode can be selected even when a state of charge of the electric storage device BT is relatively low.

The first EV mode is a mode in which the vehicle is caused to travel at a relatively low speed by using drive power of only the first rotary electric machine MG1 out of the internal combustion engine EG and the first rotary electric machine MG1. The second EV mode is a mode in which the vehicle is caused to travel at a relatively high speed by using drive power of only the first rotary electric machine MG1 out of the internal combustion engine EG and the first rotary electric machine MG1.

As shown in FIG. 4, in each of the first EV mode and the second EV mode, the first engagement device CL1 is brought into a disengaged state, the second engagement device CL2 is brought into an engaged state, and the third engagement device CL3 is brought into an engaged state. Then, the internal combustion engine EG is brought into a stopped state of not outputting drive power, and drive power of the first rotary electric machine MG1 is transmitted to the first output member O1. In the first EV mode of the present embodiment, the first engagement device CL1 is controlled to be in a disengaged state, the second engagement device CL2 is controlled to be in an engaged state, and the third engagement device CL3 is controlled to be in a state of forming the first shift speed (low speed). On the other hand, in the second EV mode of the present embodiment, the first engagement device CL1 is controlled to be in a disengaged state, the second engagement device CL2 is controlled to be in an engaged state, and the third engagement device CL3 is controlled to be in a state of forming the second shift speed (high speed). The first EV mode corresponds to a "first mode".

In each of the first EV mode and the second EV mode of the present embodiment, by causing the first engagement device CL1 to be brought into a disengaged state, the internal combustion engine EG is separated from the distribution differential gear mechanism SP, and power transmission is cut off between the internal combustion engine EG and the first output member O1. Then, by causing the second engagement device CL2 to be brought into an engaged state, the three rotary elements E1 to E3 of the distribution differential gear mechanism SP are brought into a state of rotating together with each other. As a result, rotation input from the first rotary electric machine MG1 side to the distribution differential gear mechanism SP is transmitted as it is to the first gear G1 and the second gear G2 of the transmission mechanism T. Then, the rotation transmitted to the transmission mechanism T is subjected to speed change at a transmission gear ratio of the first shift speed (low speed) in the first EV mode and at a transmission gear ratio of the second shift speed (high speed) in the second EV mode, in accordance with the state of the third engagement device CL3. Thereafter, the rotation is transmitted to the first output member O1.

The first HV mode is a mode in which the vehicle is caused to travel at a relatively low speed by using at least drive power of the internal combustion engine EG out of the internal combustion engine EG and the first rotary electric machine MG1. The second HV mode is a mode in which the vehicle is caused to travel at a relatively high speed by using at least drive power of the internal combustion engine EG out of the internal combustion engine EG and the first rotary electric machine MG1.

As shown in FIG. 4, in the first HV mode of the present embodiment, each of the first engagement device CL1 and the second engagement device CL2 is controlled to be in an engaged state, and the third engagement device CL3 is controlled to be in a state of forming the first shift speed (low speed). On the other hand, in the second HV mode of the present embodiment, each of the first engagement device CL1 and the second engagement device CL2 is controlled to be in an engaged state, and the third engagement device CL3 is controlled to be in a state of forming the second shift speed (high speed).

In each of the first HV mode and the second HV mode of the present embodiment, by causing the first engagement device CL1 to be brought into an engaged state, the internal combustion engine EG is coupled to the distribution differential gear mechanism SP. Then, by causing the second engagement device CL2 to be brought into an engaged state, the three rotary elements E1 to E3 of the distribution differential gear mechanism SP are brought into a state of rotating together with each other. As a result, rotation input from the internal combustion engine EG side and the first rotary electric machine MG1 side to the distribution differential gear mechanism SP is transmitted as it is to the first gear G1 and the second gear G2 of the transmission mechanism T. Then, the rotation transmitted to the transmission mechanism T is subjected to speed change at a transmission gear ratio of the first shift speed (low speed) in the first HV mode and at a transmission gear ratio of the second shift speed (high speed) in the second HV mode, in accordance with the state of the third engagement device CL3. Thereafter, the rotation is transmitted to the first output member O1.

The charge mode is a mode in which the electric storage device BT is charged by causing the first rotary electric machine MG1 to generate electric power using drive power of the internal combustion engine EG. As shown in FIG. 4, in the charge mode of the present embodiment, the first engagement device CL1 is controlled to be in an engaged state, the second engagement device CL2 is controlled to be in an engaged state, and the third engagement device CL3 is controlled to be in a neutral state. Then, the internal combustion engine EG is controlled to output drive power, and the first rotary electric machine MG1 is controlled to generate electric power by outputting drive power in a direction opposite to the rotational direction of the first rotor RT1 caused to rotate by using the drive power of the internal combustion engine EG. Note that, in the charge mode, the vehicle may be stopped, or the vehicle may be caused to travel by allowing the second rotary electric machine MG2 to perform power running with the electric power generated from the first rotary electric machine MG1 to transmit drive power of the second rotary electric machine MG2 to the second wheels W2. A mode in which the vehicle is caused to travel by using the drive power of the second rotary electric machine MG2 while the charge mode is maintained in this manner is referred to as a so-called series hybrid mode.

The control device 10 can perform first transition control when transition is performed from the first mode (here, the first EV mode) to the second mode (here, the eTC mode).

FIGS. 5 to 9 show speed diagrams of the distribution differential gear mechanism SP in the first transition control according to the present embodiment. In each of the speed diagrams of FIGS. 5 to 9, the vertical axis corresponds to the rotational speed of each rotary element of the distribution differential gear mechanism SP. Moreover, the plurality of respective vertical lines arranged in parallel correspond to the rotary elements of the distribution differential gear mechanism SP. Further, in each of the speed diagrams of FIGS. 5 to 9, the reference signs above the plurality of vertical lines are the reference signs of the corresponding rotary elements. Moreover, the reference signs below the plurality of vertical lines are the reference signs of the elements drivingly coupled to the rotary elements corresponding to the reference signs above. Further, in each of the speed diagrams of FIGS. 5 to 9, the mark on the vertical line corresponding to the first rotary element E1 (the left vertical line) represents a state of the first engagement device CL1. Moreover, the mark on the vertical line corresponding to the second rotary element E2 (the central vertical line) represents a state of the third engagement device CL3. Further, the mark on the vertical line corresponding to the third rotary element E3 (the right vertical line) represents a state of the second engagement device CL2. Note that, as the marks, a black circle represents that a corresponding engagement device is in a direct-coupling engaged state, a white circle represents that a corresponding engagement device is in a disengaged state, and a triangle represents that a corresponding engagement device is in a slip engaged state. The method of drawing such speed diagrams is similarly applied in FIG. 15 and the like.

The first transition control is performed in a state where the operation mode of the vehicle drive device 100 is the first mode (here, the first EV mode). FIG. 5 is a speed diagram of the distribution differential gear mechanism SP in the first EV mode. As shown in FIG. 5, in the first EV mode, the second engagement device CL2 is in an engaged state, and thus the three rotary elements E1 to E3 of the distribution differential gear mechanism SP are brought into a state of rotating together with each other. At this time, in the example shown in the drawing, the rotational speeds of the rotary elements E1 to E3 are lower than an idle rotational speed Nid of the internal combustion engine EG.

As shown in FIG. 6, in the first transition control, first, the control device 10 performs first control in which the second engagement device CL2 is changed from an engaged state to a disengaged state while the third engagement device CL3 is maintained in an engaged state. Note that FIG. 6 is a speed diagram of the distribution differential gear mechanism SP after the first control.

Figure 7:
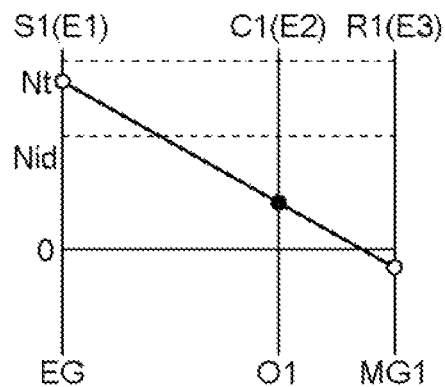
FIG. 7 is a speed diagram of the distribution differential gear mechanism in the first transition control according to the first embodiment.

As shown in FIG. 7, the control device 10 performs second control in which, after the first control described above, the rotational speed of the first rotor RT1 is controlled to cause the rotational speed of the first rotary element E1 (here, the sun gear S1) of the distribution differential gear mechanism SP to approach a target rotational speed Nt. In the present embodiment, the target rotational speed Nt is a rotational speed of the first rotary element E1 (here, the sun gear S1) determined based on a rotational speed of the internal combustion engine EG for the internal combustion engine EG to output drive power to be required after transition to the second mode (here, the eTC mode). In this example, the control device 10 controls the rotational speed of the first rotor RT1 such that the rotational speed of the sun gear S1 becomes the target rotational speed Nt.

Figure 8:
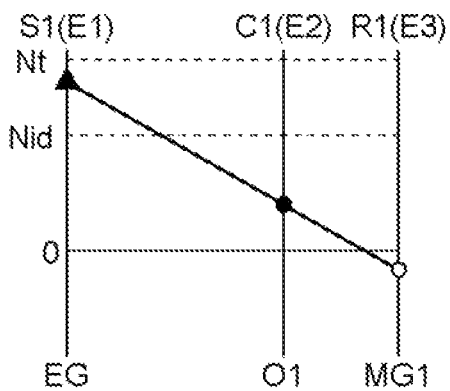
FIG. 8 is a speed diagram of the distribution differential gear mechanism in the first transition control according to the first embodiment.
Figure 9:
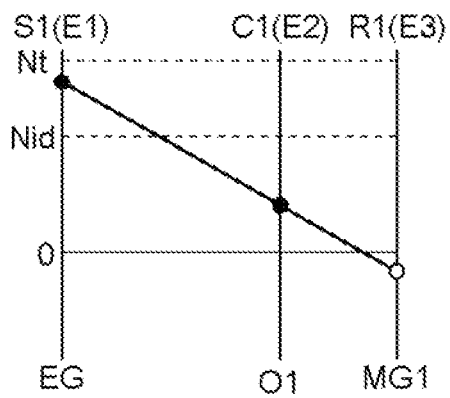
FIG. 9 is a speed diagram of the distribution differential gear mechanism in the first transition control according to the first embodiment.

As shown in FIGS. 8 and 9, the control device 10 performs third control in which, after the second control, the first engagement device CL1 is changed from a disengaged state to an engaged state and the internal combustion engine EG is started by using drive power transmitted from the first rotary electric machine MG1 to the internal combustion engine EG via the first engagement device CL1. By performing the first control, the second control, and the third control, the operation mode of the vehicle drive device 100 is subjected to transition from the first mode (here, the first EV mode) to the second mode (here, the eTC mode). In the present embodiment, in the third control, during an engagement operation in which the first engagement device CL1 is changed from a disengaged state to a direct-coupling engaged state through a slip engaged state, the control device 10 causes the rotational speed of the internal combustion engine EG to increase to start the internal combustion engine EG, by using drive power transmitted from the first rotary electric machine MG1 to the internal combustion engine EG via the first engagement device CL1 in the slip engaged state. Note that FIG. 8 is a speed diagram of the distribution differential gear mechanism SP during the third control. In addition, FIG. 9 is a speed diagram of the distribution differential gear mechanism SP after the third control, that is, in the second mode (here, the eTC mode).

As described above, the vehicle drive device 100 includes:
the input member I drivingly coupled to the internal combustion engine EG;
the first output member O1 drivingly coupled to the first wheel W1;
the first rotary electric machine MG1 including the first rotor RT1;
the distribution differential gear mechanism SP including the first rotary element E1, the second rotary element E2, and the third rotary element E3, the first rotary element E1 being drivingly coupled to the input member I, the third rotary element E3 being drivingly coupled to the first rotor RT1;
the transmission mechanism T that performs at least power transmission between the second rotary element E2 and the first output member O1;
the first engagement device CL1 that connects and disconnects power transmission between the input member I and the first rotary element E1;
the second engagement device CL2 that connects and disconnects power transmission between two rotary elements selected from among the three rotary elements that are the first rotary element E1, the second rotary element E2, and the third rotary element E3; and
the control device 10 that controls the internal combustion engine EG, the first rotary electric machine MG1, the first engagement device CL1, and the second engagement device CL2,
the transmission mechanism T including the third engagement device CL3 that connects and disconnects the power transmission between the second rotary element E2 and the first output member O1,
in which
the vehicle drive device 100 has the first mode and the second mode as operation modes,
in the first mode, the first engagement device CL1 is brought into a disengaged state, the second engagement device CL2 is brought into an engaged state, the third engagement device CL3 is brought into an engaged state, and the internal combustion engine EG is brought into a stopped state of not outputting drive power, and drive power of the first rotary electric machine MG1 is transmitted to the first output member O1,
in the second mode, the first engagement device CL1 is brought into an engaged state, the second engagement device CL2 is brought into a disengaged state, and the third engagement device CL3 is brought into an engaged state, and drive power of the internal combustion engine EG and the first rotary electric machine MG1 is transmitted to the first output member O1,
the control device 10 is allowed to perform the first transition control when transition to the second mode from the first mode is performed, and
the first transition control includes:
the first control in which the second engagement device CL2 is changed from an engaged state to a disengaged state while the third engagement device CL3 is maintained in an engaged state;
the second control in which, after the first control, the rotational speed of the first rotor RT1 is controlled to cause the rotational speed of the first rotary element E1 to approach the target rotational speed Nt; and
the third control in which, after the second control, the first engagement device CL1 is changed from a disengaged state to an engaged state and the internal combustion engine EG is started by using drive power transmitted from the first rotary electric machine MG1 to the internal combustion engine EG via the first engagement device CL1.

According to this configuration, the relationship among the rotational speeds of the three rotary elements E1 to E3 of the distribution differential gear mechanism SP can be freely changed by bringing the second engagement device CL2 into a disengaged state, and utilizing this allows the rotational speed of the first rotary element E1 of the distribution differential gear mechanism SP to easily approach the target rotational speed Nt by performing the rotational speed control of the first rotary electric machine MG1, without bringing the third engagement device CL3 into a disengaged state. As a result, the rotational speed of the first rotary element E1 can be easily changed to a rotational speed required for starting the internal combustion engine EG. In addition, after the rotational speed of the first rotary element E1 is caused to approach the target rotational speed Nt, bringing the first engagement device CL1 into an engaged state allows a state in which the drive power of the first rotary electric machine MG1 is transmittable to the internal combustion engine EG, whereby the internal combustion engine EG can be started by using the drive power of the first rotary electric machine MG1. After the start of the internal combustion engine EG, the first engagement device CL1 is in an engaged state, the second engagement device CL2 is in a disengaged state, and the third engagement device CL3 is in an engaged state. Thus, the second mode can be started without changing the states of the engagement devices CL1 to CL3. Therefore, according to this configuration, it is possible to reduce a time required for the transition from the first mode to the second mode, that is, the transition of the operation modes accompanying the start of the internal combustion engine EG.

Further, in the present embodiment, the first engagement device CL1 is a friction engagement device including a direct-coupling engaged state and a slip engaged state as engaged states, the target rotational speed Nt is a rotational speed of the first rotary element E1 determined based on a rotational speed of the internal combustion engine EG for the internal combustion engine EG to output drive power to be required after transition to the second mode, and in the third control, during an engagement operation in which the first engagement device CL1 is changed from a disengaged state to a direct-coupling engaged state through a slip engaged state, the control device 10 causes a rotational speed of the internal combustion engine EG to increase to start the internal combustion engine EG, by using drive power transmitted from the first rotary electric machine MG1 to the internal combustion engine EG via the first engagement device CL1 in a slip engaged state.

According to this configuration, with the first engagement device CL1 in a disengaged state, the rotational speed of the first rotary electric machine MG1 is controlled such that the rotational speed of the first rotary element E1 approaches the target rotational speed Nt determined based on the rotational speed of the internal combustion engine EG for the internal combustion engine EG to output the drive power to be required after the transition to the second mode. Then, during the engagement operation of the first engagement device CL1, the internal combustion engine EG is started by using the drive power of the first rotary electric machine MG1 transmitted to the internal combustion engine EG via the first engagement device CL1 in a slip engaged state. As a result, it is possible to reduce the number of times of controlling the rotational speed of the first rotary electric machine MG1, during the transition from the first mode to the second mode. In addition, the rotational speed of the first rotary electric machine MG1 can be controlled in a state where power transmission between the internal combustion engine EG and the first rotary electric machine MG1 is cut off and inertia is small, and thus the rotational speed of the first rotary element E1 is allowed to quickly approach the target rotational speed Nt. Therefore, according to this configuration, it is possible to further reduce the time required for the transition from the first mode to the second mode.

Figure 10:
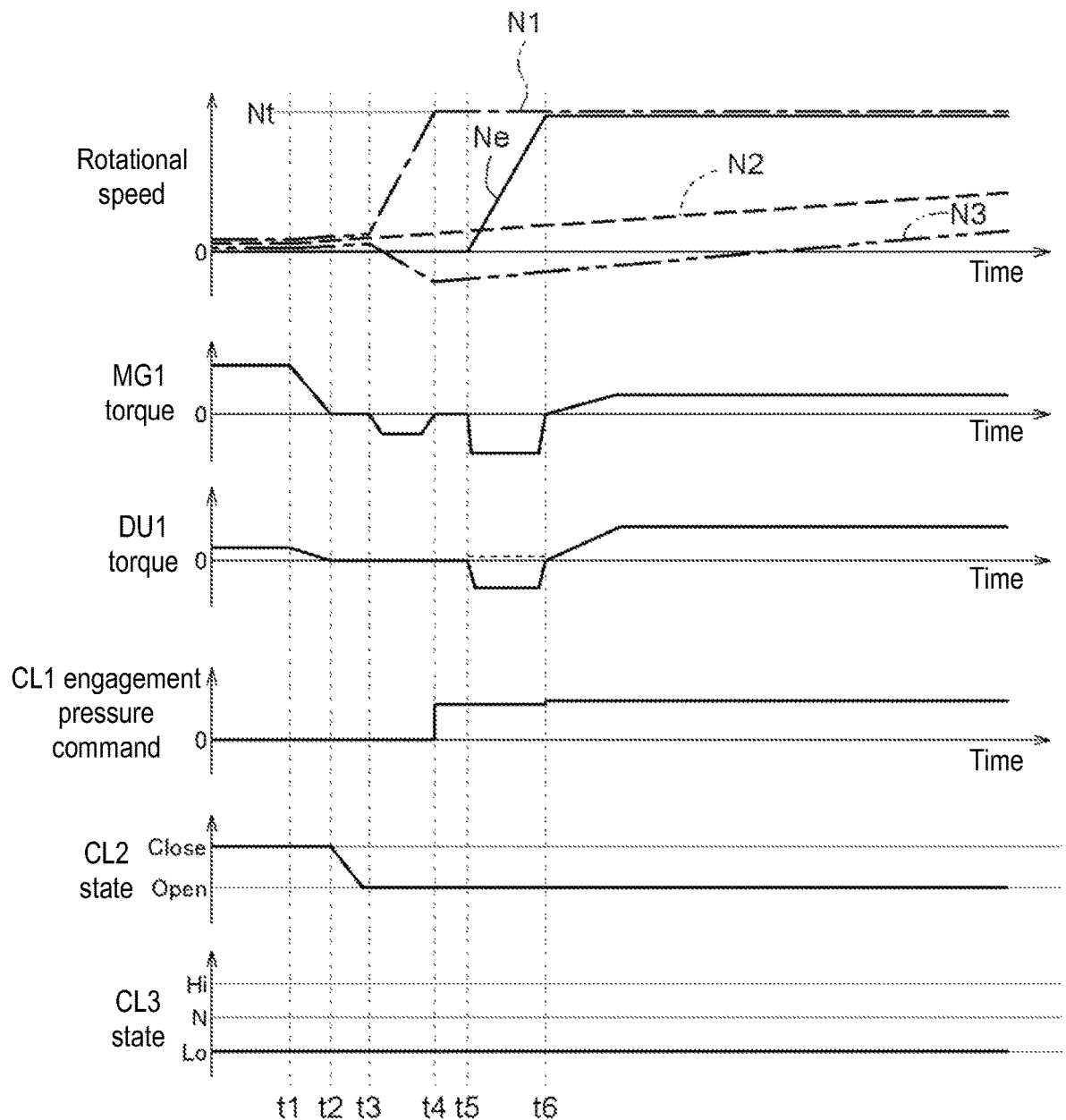
FIG. 10 includes time charts showing an example of the first transition control according to the first embodiment.

FIG. 10 includes time charts showing an example of the first transition control. As shown in FIG. 10, first, the first rotary electric machine control part 13 gradually decreases torque of the first rotary electric machine MG1 from a time t1, and decreases the torque to zero at a time t2.

Next, the engagement control part 15 causes the second engagement device CL2 to be brought into a disengaged state from an engaged state, from the time t2 to a time t3. As the second engagement device CL2 is brought into the disengaged state at the time t3, the three rotary elements E1 to E3 of the distribution differential gear mechanism SP are brought into a state of being relatively rotatable.

Then, the first rotary electric machine control part 13 performs rotational speed control of the first rotary electric machine MG1 such that a first rotational speed N1, which is the rotational speed of the sun gear S1 serving as the first rotary element E1 drivingly coupled to the internal combustion engine EG via the input member I, increases from the time t3 to become the target rotational speed Nt at a time t4. Note that, in the time chart of "rotational speed" in FIG. 10, "N1" represents the first rotational speed that is the rotational speed of the sun gear S1 serving as the first rotary element E1, "N2" represents a second rotational speed that is the rotational speed of the carrier C1 serving as the second rotary element E2, "N3" represents a third rotational speed that is the rotational speed of the ring gear R1 serving as the third rotary element E3, and "Ne" represents an internal combustion engine rotational speed that is the rotational speed of the internal combustion engine EG.

Subsequently, the main control part 11 commands the engagement control part 15 to cause the first engagement device CL1 to be brought into an engaged state, at the time t4. As a result, an engagement pressure of the first engagement device CL1 starts to increase, and the first engagement device CL1 is brought into a slip engaged state. Then, the first rotary electric machine control part 13 controls the first rotary electric machine MG1 such that the internal combustion engine rotational speed Ne increases from a time t5 to become the first rotational speed N1 (target rotational speed Nt) at a time t6 by using drive power transmitted from the first rotary electric machine MG1 to the internal combustion engine EG via the first engagement device CL1 in the slip engaged state. The internal combustion engine control part 12 starts the internal combustion engine EG, between the time t5 and the time t6.

As described above, in the first transition control, the internal combustion engine rotational speed Ne is increased by using the drive power transmitted from the first rotary electric machine MG1 to the internal combustion engine EG via the first engagement device CL1 in the slip engaged state, from the time t5 to the time t6. At this time, in the first transition control, the third engagement device CL3 is in an engaged state, and thus fluctuation in drive power occurs in the first drive unit DU1 due to transmission of fluctuation in drive power of the first rotary electric machine MG1, the internal combustion engine EG, and the like to the first output member O1. In the present embodiment, while the first transition control is performed, the control device 10 performs drive power compensation control in which the second rotary electric machine MG2 is caused to output drive power to compensate for fluctuation in drive power, from the first rotary electric machine MG1 and the internal combustion engine EG, transmitted to the first output member O1 via the transmission mechanism T. In this example, in the drive power compensation control, the control device 10 causes the second rotary electric machine MG2 to output positive drive power to compensate for negative drive power, transmitted to the first output member O1 via the transmission mechanism T, as a reaction force of drive power for starting the internal combustion engine EG. In the example shown in FIG. 10, the second rotary electric machine MG2 is controlled such that the sum of the negative drive power in the first drive unit DU1 and the positive drive power in the second drive unit DU2 becomes zero (see the dot-line portion in the time chart of "DU1 torque" in FIG. 10).

Note that, as described above, in the present embodiment, the second rotary electric machine MG2 is drivingly coupled to, not via the first output member O1, the second output member O2 drivingly coupled to the second wheels W2 that are different from the first wheels W1. However, although the detailed configuration will be described later, the second rotary electric machine MG2 may be configured to be drivingly coupled to the first output member O1 on the first output member O1 side with respect to the third engagement device CL3 in a power transmission path between the second rotary element E2 of the distribution differential gear mechanism SP and the first output member O1 (see FIG. 20).

As described above, in the present embodiment, the vehicle drive device 100 further includes the second rotary electric machine MG2 that is drivingly coupled to, not via the first output member O1, the second output member O2 drivingly coupled to the second wheel W2 different from the first wheel W1, or that is drivingly coupled to the first output member O1 on the first output member O1 side with respect to the third engagement device CL3 in the power transmission path between the second rotary element E2 and the first output member O1, and while the first transition control is performed, the control device 10 performs drive power compensation control in which the second rotary electric machine MG2 is caused to output drive power to compensate for fluctuation in drive power, from the first rotary electric machine MG1 and the internal combustion engine EG, transmitted to the first output member O1 via the transmission mechanism T.

According to this configuration, it is possible to reduce fluctuation in drive power in the entire vehicle, during the transition from the first mode to the second mode.

Hereinafter, control processing of the control device 10 when transition of the operation mode of the vehicle drive device 100 is performed from the first mode to the second mode will be described with reference to FIGS. 11 to 13.

Figure 11:
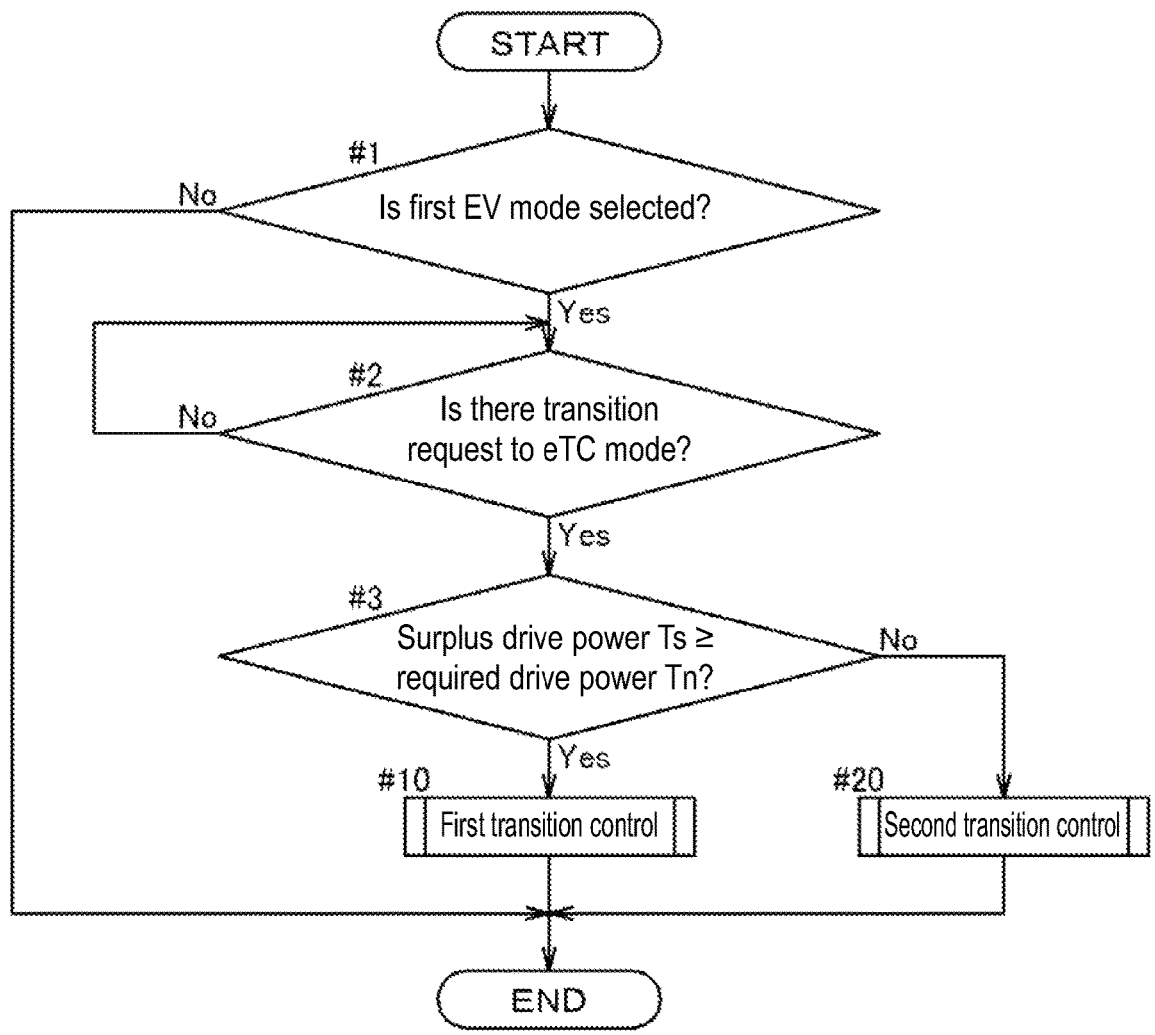
FIG. 11 is a flowchart showing an example of control processing of a control device when transition is performed from a first mode to a second mode.

FIG. 11 is a flowchart showing an example of the control processing of the control device 10 when transition of the operation mode of the vehicle drive device 100 is performed from the first mode (here, the first EV mode) to the second mode (here, the eTC mode). As shown in FIG. 11, first, the control device 10 determines whether the current operation mode of the vehicle drive device 100 is the first EV mode (step #1). In the present embodiment, the main control part 11 performs the above determination by determining whether the internal combustion engine EG is in a stopped state through the internal combustion engine control part 12, determining whether the first rotary electric machine MG1 is in a power running state through the first rotary electric machine control part 13, and determining whether the first engagement device CL1 is in a disengaged state and the second engagement device CL2 and the third engagement device CL3 are in engaged states through the engagement control part 15.

When the control device 10 determines that the current operation mode of the vehicle drive device 100 is not the first EV mode (step #1: No), the control device 10 ends the control. On the other hand, when the control device 10 determines that the current operation mode of the vehicle drive device 100 is the first EV mode (step #1: Yes), the control device 10 determines whether there is a transition request to the eTC mode (step #2). In the present embodiment, the main control part 11 performs the above determination based on the state of charge of the electric storage device BT calculated based on the detection signal of the SOC sensor Se1, the vehicle speed calculated based on the detection signal of the vehicle speed sensor Se2, the accelerator opening degree calculated based on the detection signal of the accelerator operation amount sensor Se3, the operation amount of the brake pedal calculated based on the detection signal of the brake operation amount sensor Se4, the shift position calculated based on the detection signal of the shift position sensor Se5, and the like.

When there is a transition request to the eTC mode (step #2: Yes), the control device 10 determines whether surplus drive power Ts is equal to or larger than required drive power Tn (step #3). Here, the surplus drive power Ts is a difference between drive power being output by the second rotary electric machine MG2 and upper-limit drive power outputtable by the second rotary electric machine MG2. The required drive power Tn is drive power required for performing the drive power compensation control. In the present embodiment, the main control part 11 performs the above determination by grasping a state at this moment of the second rotary electric machine MG2 through the second rotary electric machine control part 14. Here, the upper-limit drive power outputtable by the second rotary electric machine MG2 is the maximum drive power (torque) that can be output by the second rotary electric machine MG2 at that time in accordance with performance of the second rotary electric machine MG2, a state of the electric storage device BT (specifically, an outputtable current), and the like. Note that the upper-limit drive power may be a fixed value determined in accordance with the performance of the second rotary electric machine MG2 regardless of the state of the electric storage device BT and the like.

When the control device 10 determines that the surplus drive power Ts is equal to or larger than the required drive power Tn (step #3: Yes), the control device 10 performs the first transition control described above (step #10). On the other hand, when the control device 10 determines that the surplus drive power Ts is smaller than the required drive power Tn (step #3: No), the control device 10 performs second transition control that is different from the first transition control (step #20).

Figure 12:
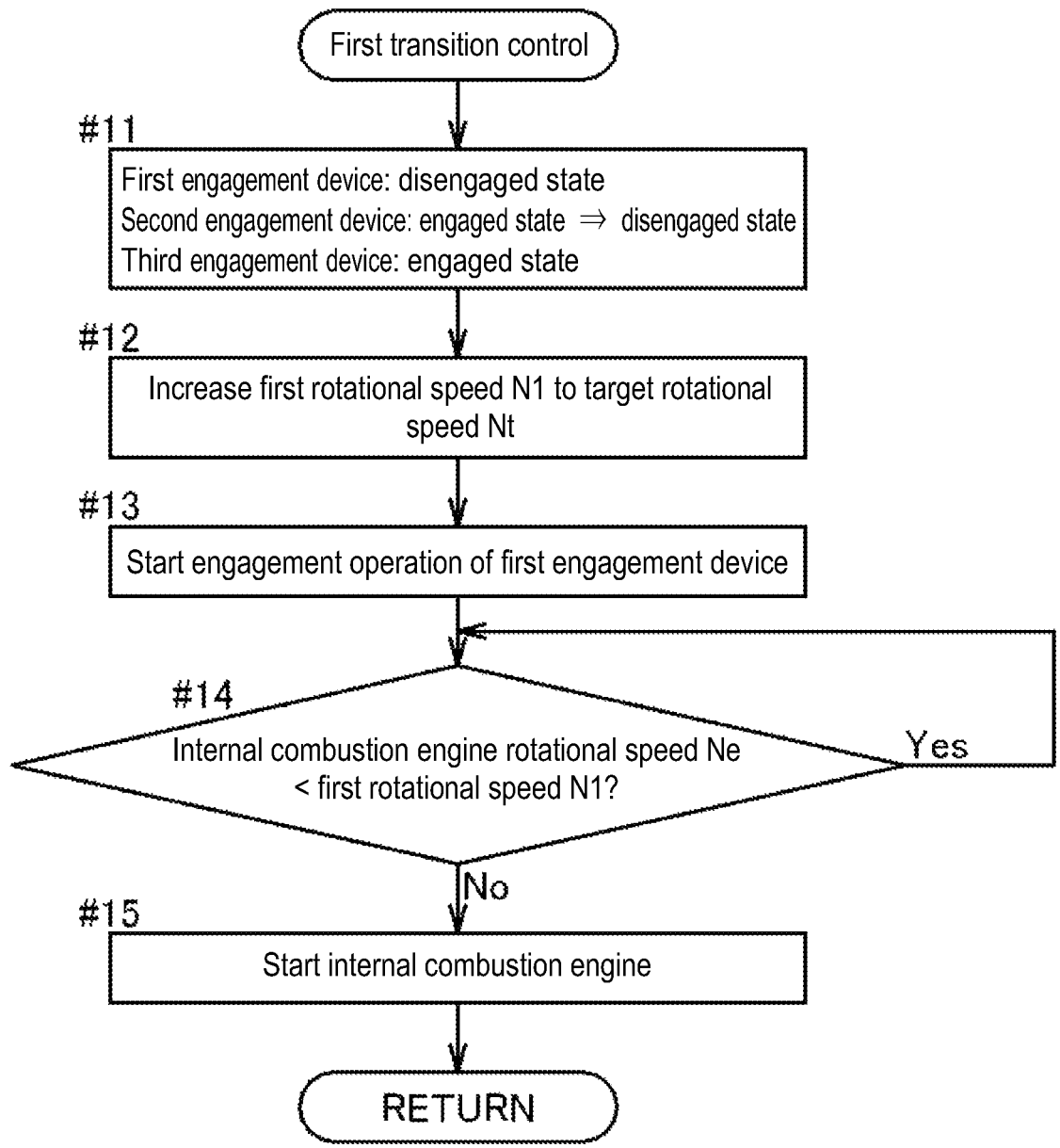
FIG. 12 is a flowchart showing an example of the first transition control according to the first embodiment.

FIG. 12 is a flowchart showing an example of the first transition control. As shown in FIG. 12, in the first transition control, first, the control device 10 performs the first control in which the second engagement device CL2 is changed from an engaged state to a disengaged state while the third engagement device CL3 is maintained in an engaged state (step #11). Note that, at this time, the first engagement device CL1 is maintained in a disengaged state. In the present embodiment, the engagement control part 15 changes the second engagement device CL2 from the engaged state to the disengaged state while the states of engagement of the first engagement device CL1 and the third engagement device CL3 are maintained.

Next, the control device 10 performs the second control in which the rotational speed of the first rotor RT1 is controlled to cause the first rotational speed N1, which is the rotational speed of the sun gear S1 serving as the first rotary element E1, to approach the target rotational speed Nt (step #12). In the present embodiment, the first rotary electric machine control part 13 performs the rotational speed control of the first rotary electric machine MG1 to increase the first rotational speed N1 to the target rotational speed Nt.

Subsequently, the control device 10 starts an engagement operation in which the first engagement device CL1 is changed from the disengaged state to a direct-coupling engaged state through a slip engaged state (step #13), and the control device 10 causes the internal combustion engine rotational speed Ne to increase by using drive power transmitted from the first rotary electric machine MG1 to the internal combustion engine EG via the first engagement device CL1 in the slip engaged state. Then, the control device 10 determines whether the internal combustion engine rotational speed Ne has reached the first rotational speed N1 (target rotational speed Nt) (step #14).

When the internal combustion engine rotational speed Ne has reached the first rotational speed N1 (target rotational speed Nt) (step #14: No), the control device 10 causes the internal combustion engine EG to be started (step #15), as a result of which the operation mode is set to the eTC mode and the control device 10 ends the first transition control. Note that, even before the internal combustion engine rotational speed Ne reaches the first rotational speed N1 (target rotational speed Nt), the internal combustion engine EG may be started when or after the internal combustion engine rotational speed Ne becomes equal to or higher than the idle rotational speed Nid. Here, above steps #13 to #15 correspond to the "third control" in which the first engagement device CL1 is changed from a disengaged state to an engaged state and the internal combustion engine EG is started by using drive power transmitted from the first rotary electric machine MG1 to the internal combustion engine EG via the first engagement device CL1.

Figure 13:
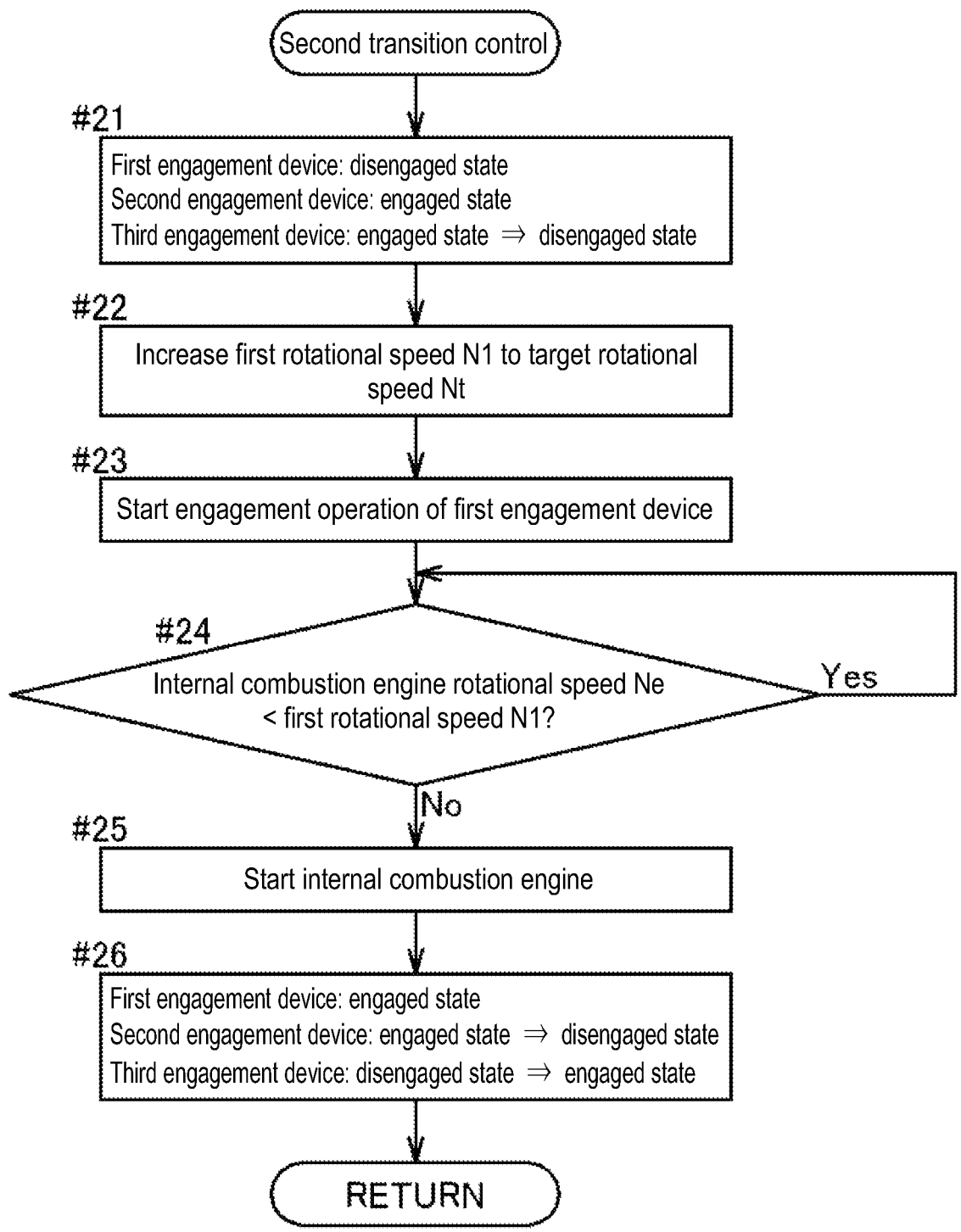
FIG. 13 is a flowchart showing an example of second transition control according to the first embodiment.

FIG. 13 is a flowchart showing an example of the second transition control. As shown in FIG. 13, in the second transition control, first, the control device 10 performs fourth control in which the third engagement device CL3 is changed from an engaged state to a disengaged state while the second engagement device CL2 is maintained in an engaged state (step #21). Note that, at this time, the first engagement device CL1 is maintained in a disengaged state. In the present embodiment, the engagement control part 15 changes the third engagement device CL3 from the engaged state to the disengaged state while the states of engagement of the first engagement device CL1 and the second engagement device CL2 are maintained.

Next, the control device 10 performs fifth control in which the rotational speed of the first rotor RT1 is controlled to cause the first rotational speed N1, which is the rotational speed of the sun gear S1 serving as the first rotary element E1, to approach the target rotational speed Nt (step #22). In the present embodiment, the first rotary electric machine control part 13 performs the rotational speed control of the first rotary electric machine MG1 to increase the first rotational speed N1 to the target rotational speed Nt.

Subsequently, the control device 10 starts an engagement operation in which the first engagement device CL1 is changed from the disengaged state to a direct-coupling engaged state through a slip engaged state (step #23), and the control device 10 causes the internal combustion engine rotational speed Ne to increase by using drive power transmitted from the first rotary electric machine MG1 to the internal combustion engine EG via the first engagement device CL1 in the slip engaged state. Then, the control device 10 determines whether the internal combustion engine rotational speed Ne has reached the first rotational speed N1 (target rotational speed Nt) (step #24).

When the internal combustion engine rotational speed Ne has reached the first rotational speed N1 (target rotational speed Nt) (step #24: No), the control device 10 causes the internal combustion engine EG to be started (step #25). Note that, even before the internal combustion engine rotational speed Ne reaches the first rotational speed N1 (target rotational speed Nt), the internal combustion engine EG may be started when or after the internal combustion engine rotational speed Ne becomes equal to or higher than the idle rotational speed Nid. Here, above steps #23 to #25 correspond to "sixth control" in which the first engagement device CL1 is changed from a disengaged state to an engaged state and the internal combustion engine EG is started by using drive power transmitted from the first rotary electric machine MG1 to the internal combustion engine EG via the first engagement device CL1.

Thereafter, the control device 10 performs seventh control in which the third engagement device CL3 is changed from the disengaged state to an engaged state and the second engagement device CL2 is changed from the engaged state to a disengaged state (step #26), as a result of which the operation mode is set to the eTC mode and the control device 10 ends the second transition control. In the present embodiment, after the start of the internal combustion engine EG, the engagement control part 15 changes the first engagement device CL1 from the engaged state to a disengaged state. Thereafter, the first rotary electric machine control part 13 performs rotational speed control of the first rotary electric machine MG1 such that a second rotational speed N2, which is the rotational speed of the carrier C1 serving as the second rotary element E2 drivingly coupled to the first output member O1, becomes a rotational speed of the carrier C1 determined in accordance with a rotational speed of the first output member O1 when the third engagement device CL3 is brought into an engaged state at that time. Subsequently, the engagement control part 15 changes the third engagement device CL3 from the disengaged state to the engaged state, and changes the second engagement device CL2 from the engaged state to the disengaged state. Thereafter, the first rotary electric machine control part 13 performs rotational speed control of the first rotary electric machine MG1 to increase the first rotational speed N1, which is the rotational speed of the sun gear S1 serving as the first rotary element E1 drivingly coupled to the internal combustion engine EG via the input member I, to the target rotational speed Nt. In this example, the internal combustion engine rotational speed Ne is maintained at the target rotational speed Nt, and thus the first rotational speed N1 approaches the internal combustion engine rotational speed Ne. Then, the engagement control part 15 changes the first engagement device CL1 from the disengaged state to the engaged state to set the operation mode to the eTC mode.

Figure 14:
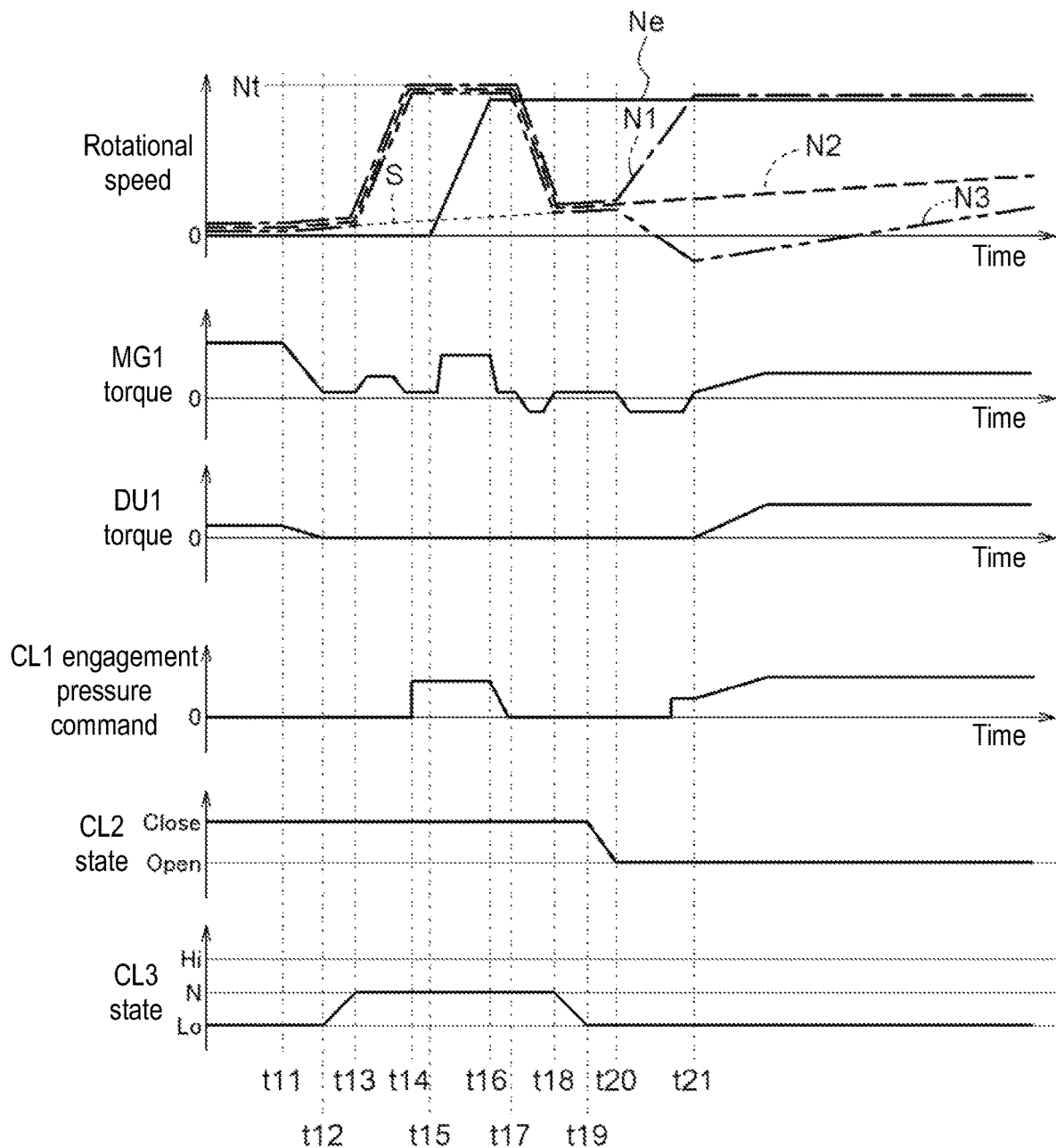
FIG. 14 includes time charts showing an example of the second transition control according to the first embodiment.

FIG. 14 includes time charts showing an example of the second transition control. As shown in FIG. 14, first, the first rotary electric machine control part 13 gradually decreases torque of the first rotary electric machine MG1 from a time t11, and decreases the torque to zero at a time t12.

Next, the engagement control part 15 changes the third engagement device CL3 from an engaged state (here, a state in which a low speed is formed) to a disengaged state (here, a neutral state), from the time t12 to a time t13.

Then, the first rotary electric machine control part 13 performs rotational speed control of the first rotary electric machine MG1 such that the first rotational speed N1, which is the rotational speed of the sun gear S1 serving as the first rotary element E1 drivingly coupled to the internal combustion engine EG via the input member I, increases from the time t13 to become the target rotational speed Nt at a time t14. At this time, the second engagement device CL2 is in an engaged state, and thus the three rotary elements E1 to E3 of the distribution differential gear mechanism SP are in a state of rotating together with each other. As a result, the first rotational speed N1, the second rotational speed N2, and the third rotational speed N3 increase together to reach the target rotational speed Nt at the time t14.

Subsequently, the main control part 11 commands the engagement control part 15 to cause the first engagement device CL1 to be brought into an engaged state, at the time t14. As a result, an engagement pressure of the first engagement device CL1 starts to increase, and the first engagement device CL1 is brought into a slip engaged state. Then, the first rotary electric machine control part 13 controls the first rotary electric machine MG1 such that the internal combustion engine rotational speed Ne increases from a time t15 to become the first rotational speed N1 (target rotational speed Nt) at a time t16 by using drive power transmitted from the first rotary electric machine MG1 to the internal combustion engine EG via the first engagement device CL1 in the slip engaged state. The internal combustion engine control part 12 starts the internal combustion engine EG, between the time t15 and the time t16. At this time, in the second transition control, the third engagement device CL3 is in the disengaged state. Thus, fluctuation in drive power of the first rotary electric machine MG1, the internal combustion engine EG, and the like is not transmitted to the first output member O1, and fluctuation of drive power does not occur in the first drive unit DU1. Therefore, in the second transition control of the present embodiment, the drive power compensation control is not performed.

After the start of the internal combustion engine EG, the engagement control part 15 changes the first engagement device CL1 from the engaged state to a disengaged state, from the time t16 to a time t17. Then, the first rotary electric machine control part 13 performs rotational speed control of the first rotary electric machine MG1 such that the second rotational speed N2, which is the rotational speed of the carrier C1 serving as the second rotary element E2 drivingly coupled to the first output member O1, decreases from the time t17 to become, at a time t18, a rotational speed of the carrier C1 (see synchronous line S in the time chart of "rotational speed" in FIG. 14) determined in accordance with a rotational speed of the first output member O1 when the third engagement device CL3 is brought into an engaged state at that time. At this time, the second engagement device CL2 is in the engaged state, and thus the three rotary elements E1 to E3 of the distribution differential gear mechanism SP are in a state of rotating together with each other. As a result, the first rotational speed N1, the second rotational speed N2, and the third rotational speed N3 decrease together.

Subsequently, the engagement control part 15 changes the third engagement device CL3 from the disengaged state (here, the neutral state) to an engaged state (here, a state in which a low speed is formed), from the time t18 to a time t19. Then, the engagement control part 15 causes the second engagement device CL2 to be brought into a disengaged state from the engaged state, from the time t19 to a time t20. As the second engagement device CL2 is brought into the disengaged state at the time t20, the three rotary elements E1 to E3 of the distribution differential gear mechanism SP are brought into a state of being relatively rotatable.

Thereafter, the first rotary electric machine control part 13 performs rotational speed control of the first rotary electric machine MG1 such that the first rotational speed N1, which is the rotational speed of the sun gear S1 serving as the first rotary element E1 drivingly coupled to the internal combustion engine EG via the input member I, increases from the time t20 to become the target rotational speed Nt at a time t21. In this example, after the first engagement device CL1 is brought into the disengaged state at the time t17, the internal combustion engine rotational speed Ne is maintained at the target rotational speed Nt until the time t21. Accordingly, the first rotational speed N1 and the internal combustion engine rotational speed Ne approach the same rotational speed.

Then, the main control part 11 commands the engagement control part 15 to cause the first engagement device CL1 to be brought into an engaged state such that the first engagement device CL1 is brought into a direct-coupling engaged state at or after the time t21. In the example of FIG. 14, the main control part 11 causes a target engagement pressure (engagement pressure command) to increase to the vicinity of a stroke end pressure before the time t21. Then, the main control part 11 causes the target engagement pressure (engagement pressure command) to gradually increase from the stroke end pressure, from the time t21.

As described above, in the present embodiment, the control device 10 is allowed to selectively perform the first transition control and the second transition control when transition to the second mode from the first mode is performed, the second transition control includes:
the fourth control in which the third engagement device CL3 is changed from an engaged state to a disengaged state while the second engagement device CL2 is maintained in an engaged state;
the fifth control in which, after the fourth control, the rotational speed of the first rotor RT1 is controlled to cause the rotational speed of the first rotary element E1 to approach the target rotational speed Nt;
the sixth control in which, after the fifth control, the first engagement device CL1 is changed from a disengaged state to an engaged state and the internal combustion engine EG is started by using drive power transmitted from the first rotary electric machine MG1 to the internal combustion engine EG via the first engagement device CL1; and
the seventh control in which, after the sixth control, the third engagement device CL3 is changed from a disengaged state to an engaged state and the second engagement device CL2 is changed from an engaged state to a disengaged state, and
the control device 10 performs the first transition control when the surplus drive power Ts that is a difference between drive power being output by the second rotary electric machine MG2 and upper-limit drive power outputtable by the second rotary electric machine MG2 is equal to or larger than the required drive power Tn that is drive power required for performing the drive power compensation control, and performs the second transition control when the surplus drive power Ts is smaller than the required drive power Tn.

According to this configuration, in the second transition control, the internal combustion engine EG is started by using the drive power transmitted from the first rotary electric machine MG1 to the internal combustion engine EG via the first engagement device CL1, while the third engagement device CL3, which connects and disconnects the power transmission between the second rotary element E2 of the distribution differential gear mechanism SP and the first output member O1, is in a disengaged state. This can prevent fluctuation in drive power of the first rotary electric machine MG1, the internal combustion engine EG, and the like while the second transition control is performed from being transmitted to the first output member O1. Thus, while the second transition control is performed, it is possible to reduce fluctuation in drive power in the entire vehicle, even when the drive power compensation control is not performed.

In addition, according to this configuration, when the surplus drive power Ts is equal to or larger than the required drive power Tn, the first transition control including the drive power compensation control is performed. On the other hand, when the surplus drive power Ts is smaller than the required drive power Tn, the second transition control not including the drive power compensation control is performed. As a result, even when the drive power required for performing the drive power compensation control does not remain in the second rotary electric machine MG2, the second transition control that does not require the drive power compensation control can be performed. Thus, regardless of the state of the second rotary electric machine MG2, it is possible to reduce fluctuation in drive power in the entire vehicle.

2. Second Embodiment

Hereinafter, a vehicle drive device 100 according to a second embodiment will be described with reference to the drawings. In the present embodiment, the content of the first transition control is different from that in the first embodiment. Hereinafter, differences from the first embodiment will be mainly described. Note that points not specifically described are similar to those in the first embodiment.

In the first transition control of the present embodiment, a first control similar to that of the first embodiment is performed. Therefore, the state (see FIG. 5) of each rotary element of the distribution differential gear mechanism SP before the first control (first EV mode) of the present embodiment and the state (see FIG. 6) of each rotary element of the distribution differential gear mechanism SP after the first control of the present embodiment are similar to those of the first embodiment, and thus the detailed description thereof will be omitted.

Figure 15:
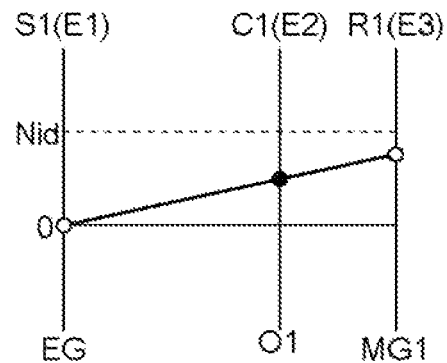
FIG. 15 is a speed diagram of a distribution differential gear mechanism in first transition control according to a second embodiment.

As shown in FIG. 15, in a second control of the present embodiment, the control device 10 controls the rotational speed of the first rotor RT1 to cause the rotational speed of the first rotary element E1 (here, the sun gear S1) of the distribution differential gear mechanism SP to approach zero. That is, in the present embodiment, the target rotational speed Nt is zero. In this example, the control device 10 controls the rotational speed of the first rotor RT1 such that the rotational speed of the sun gear S1 becomes zero.

Figure 16:
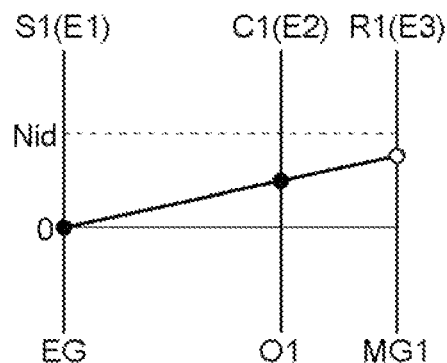
FIG. 16 is a speed diagram of the distribution differential gear mechanism in the first transition control according to the second embodiment.
Figure 17:
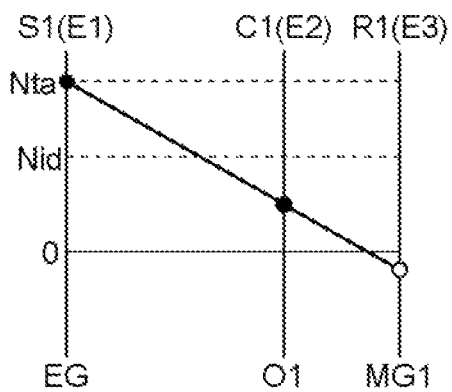
FIG. 17 is a speed diagram of the distribution differential gear mechanism in the first transition control according to the second embodiment.

As shown in FIG. 16, in a third control of the present embodiment, the control device 10 causes the first engagement device to be changed from a disengaged state to a direct-coupling engaged state. Thereafter, as shown in FIG. 17, the control device 10 controls the rotational speed of the first rotor RT1 to cause the rotational speed of the first rotary element E1 (here, the sun gear S1) to approach a post-transition target rotational speed Nta. As a result, drive power is transmitted from the first rotary electric machine MG1 to the internal combustion engine EG via the first engagement device CL1 in the direct-coupling engaged state, and the internal combustion engine rotational speed Ne increases. The control device 10 causes the internal combustion engine EG to be started by utilizing the increase in the internal combustion engine rotational speed Ne caused by the drive power transmitted from the first rotary electric machine MG1 to the internal combustion engine EG in this manner. Here, the post-transition target rotational speed Nta is a rotational speed of the first rotary element E1 (here, the sun gear S1) determined based on a rotational speed of the internal combustion engine EG for the internal combustion engine EG to output drive power to be required after transition to the second mode (here, the eTC mode). The post-transition target rotational speed Nta of the present embodiment is the same value as the target rotational speed Nt of the first embodiment.

Figure 18:
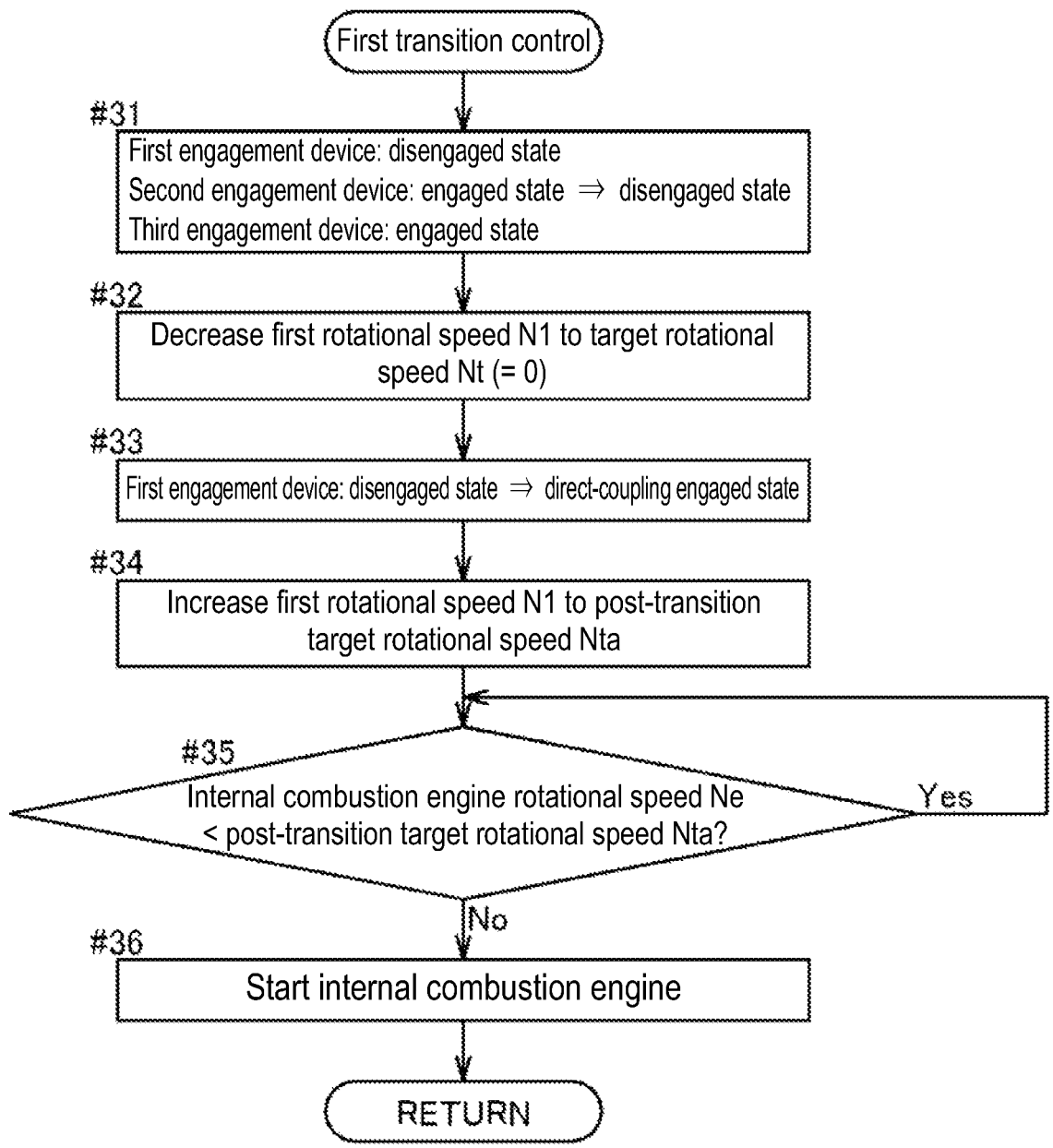
FIG. 18 is a flowchart showing an example of the first transition control according to the second embodiment.

FIG. 18 is a flowchart showing an example of the first transition control according to the present embodiment. As shown in FIG. 18, first, the control device 10 performs the first control in which the second engagement device CL2 is changed from an engaged state to a disengaged state while the third engagement device CL3 is maintained in an engaged state (step #31). Note that, at this time, the first engagement device CL1 is maintained in a disengaged state. In the present embodiment, the engagement control part 15 changes the second engagement device CL2 from the engaged state to the disengaged state while the states of engagement of the first engagement device CL1 and the third engagement device CL3 are maintained.

Next, the control device 10 performs the second control in which the rotational speed of the first rotor RT1 is controlled to cause the first rotational speed N1, which is the rotational speed of the sun gear S1 serving as the first rotary element E1, to approach zero that is a value of the target rotational speed Nt (step #32). In the present embodiment, the first rotary electric machine control part 13 performs the rotational speed control of the first rotary electric machine MG1 to decrease the first rotational speed N1 to zero.

Subsequently, the control device 10 causes the first engagement device CL1 to be changed to a direct-coupling engaged state (step #33). Thereafter, the control device 10 controls the rotational speed of the first rotor RT1 to cause the first rotational speed N1 to approach the post-transition target rotational speed Nta (step #34). In the present embodiment, the first rotary electric machine control part 13 performs the rotational speed control of the first rotary electric machine MG1 to increase the first rotational speed N1 to the post-transition target rotational speed Nta. In this manner, the control device 10 causes the internal combustion engine rotational speed Ne to increase by using the drive power transmitted from the first rotary electric machine MG1 to the internal combustion engine EG via the first engagement device CL1 in the direct-coupling engaged state. Then, the control device 10 determines whether the internal combustion engine rotational speed Ne has reached the post-transition target rotational speed Nta (step #35).

When the internal combustion engine rotational speed Ne has reached the post-transition target rotational speed Nta (step #35: No), the control device 10 causes the internal combustion engine EG to be started (step #36), as a result of which the operation mode is set to the eTC mode and the control device 10 ends the first transition control. Note that, even before the internal combustion engine rotational speed Ne reaches the post-transition target rotational speed Nta, the internal combustion engine EG may be started when or after the internal combustion engine rotational speed Ne becomes equal to or higher than the idle rotational speed Nid. Here, above steps #33 to #36 correspond to the "third control" in which the first engagement device CL1 is changed from a disengaged state to an engaged state and the internal combustion engine EG is started by using drive power transmitted from the first rotary electric machine MG1 to the internal combustion engine EG via the first engagement device CL1.

Figure 19:
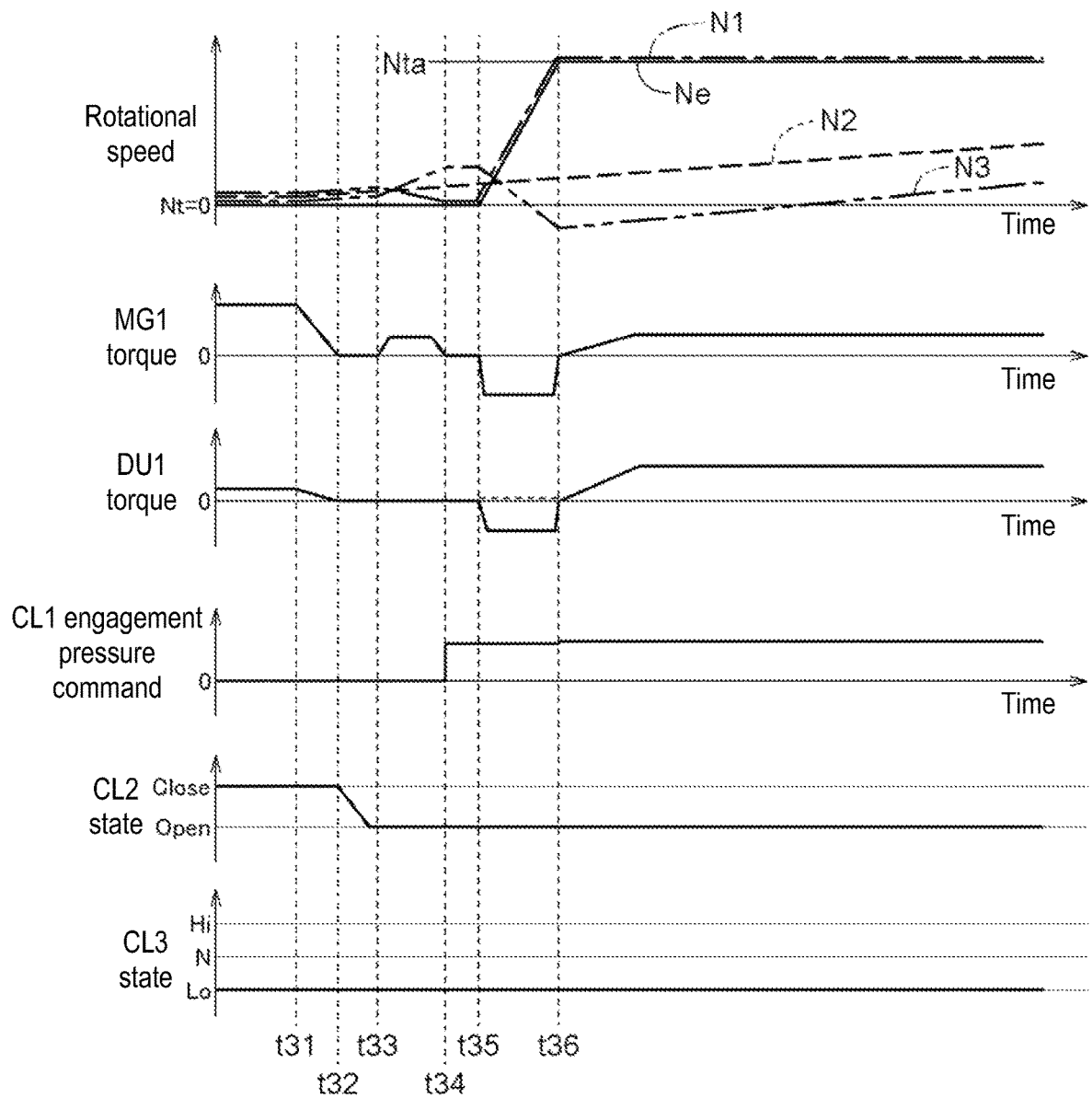
FIG. 19 includes time charts showing an example of the first transition control according to the second embodiment.

FIG. 19 includes time charts showing an example of the first transition control according to the present embodiment. As shown in FIG. 19, first, the first rotary electric machine control part 13 gradually decreases torque of the first rotary electric machine MG1 from a time t31, and decreases the torque to zero at a time t32.

Next, the engagement control part 15 causes the second engagement device CL2 to be brought into a disengaged state from an engaged state, from the time t32 to a time t33. As the second engagement device CL2 is brought into the disengaged state at the time t33, the three rotary elements E1 to E3 of the distribution differential gear mechanism SP are brought into a state of being relatively rotatable.

Then, the first rotary electric machine control part 13 performs rotational speed control of the first rotary electric machine MG1 such that the first rotational speed N1, which is the rotational speed of the sun gear S1 serving as the first rotary element E1 drivingly coupled to the internal combustion engine EG via the input member I, increases from the time t33 to become zero at a time t34.

Subsequently, the main control part 11 commands the engagement control part 15 to cause the first engagement device CL1 to be brought into an engaged state, at the time t34. As a result, the first engagement device CL1 is brought into a direct-coupling engaged state. Then, the first rotary electric machine control part 13 controls the first rotary electric machine MG1 such that the internal combustion engine rotational speed Ne increases from a time t35 to become the post-transition target rotational speed Nta at a time t36 by using drive power transmitted from the first rotary electric machine MG1 to the internal combustion engine EG via the first engagement device CL1 in the direct-coupling engaged state. The internal combustion engine control part 12 starts the internal combustion engine EG, between the time t35 and the time t36.

Note that, also in the present embodiment, similarly to the first embodiment described above, when the internal combustion engine rotational speed Ne is increased, the third engagement device CL3 is in an engaged state, and thus fluctuation in drive power occurs in the first drive unit DU1 due to transmission of fluctuation in drive power of the first rotary electric machine MG1, the internal combustion engine EG, and the like to the first output member O1. Therefore, also in the present embodiment, while the first transition control is performed, the control device 10 performs the drive power compensation control in which the second rotary electric machine MG2 is caused to output drive power to compensate for fluctuation in drive power, from the first rotary electric machine MG1 and the internal combustion engine EG, transmitted to the first output member O1 via the transmission mechanism T.

As described above, in the present embodiment, the target rotational speed Nt is zero,
  a rotational speed of the first rotary element E1 determined based on a rotational speed of the internal combustion engine EG for the internal combustion engine EG to output drive power to be required after transition to the second mode is set as a post-transition target rotational speed Nta, and
  in the third control, after the first engagement device CL1 is changed from a disengaged state to a direct-coupling engaged state, the control device 10 controls the rotational speed of the first rotor RT1 to cause the rotational speed of the first rotary element E1 to approach the post-transition target rotational speed Nta, and causes a rotational speed of the internal combustion engine EG to increase to start the internal combustion engine EG, by using drive power transmitted from the first rotary electric machine MG1 to the internal combustion engine EG via the first engagement device CL1 in a direct-coupling engaged state.

According to this configuration, when the internal combustion engine EG is started, the rotational speed of the first rotary element E1 is controlled to approach zero, which is the same value as the rotational speed of the internal combustion engine EG, then the first engagement device CL1 is brought into a direct-coupling engaged state, and the rotational speed of the first rotary element E1 is increased to correspond to the post-transition target rotational speed Nta, thereby starting the internal combustion engine EG using the drive power of the first rotary electric machine MG1. That is, it is not necessary to bring the first engagement device CL1 into a slip engaged state when the internal combustion engine EG is started. This facilitates simplification of the structure and reduction in cost of the first engagement device CL1. In addition, it is possible to reduce loss of energy consumed by being converted into heat in the first engagement device CL1, and thus it is possible to enhance energy efficiency of the vehicle drive device 100.

Figure 20:
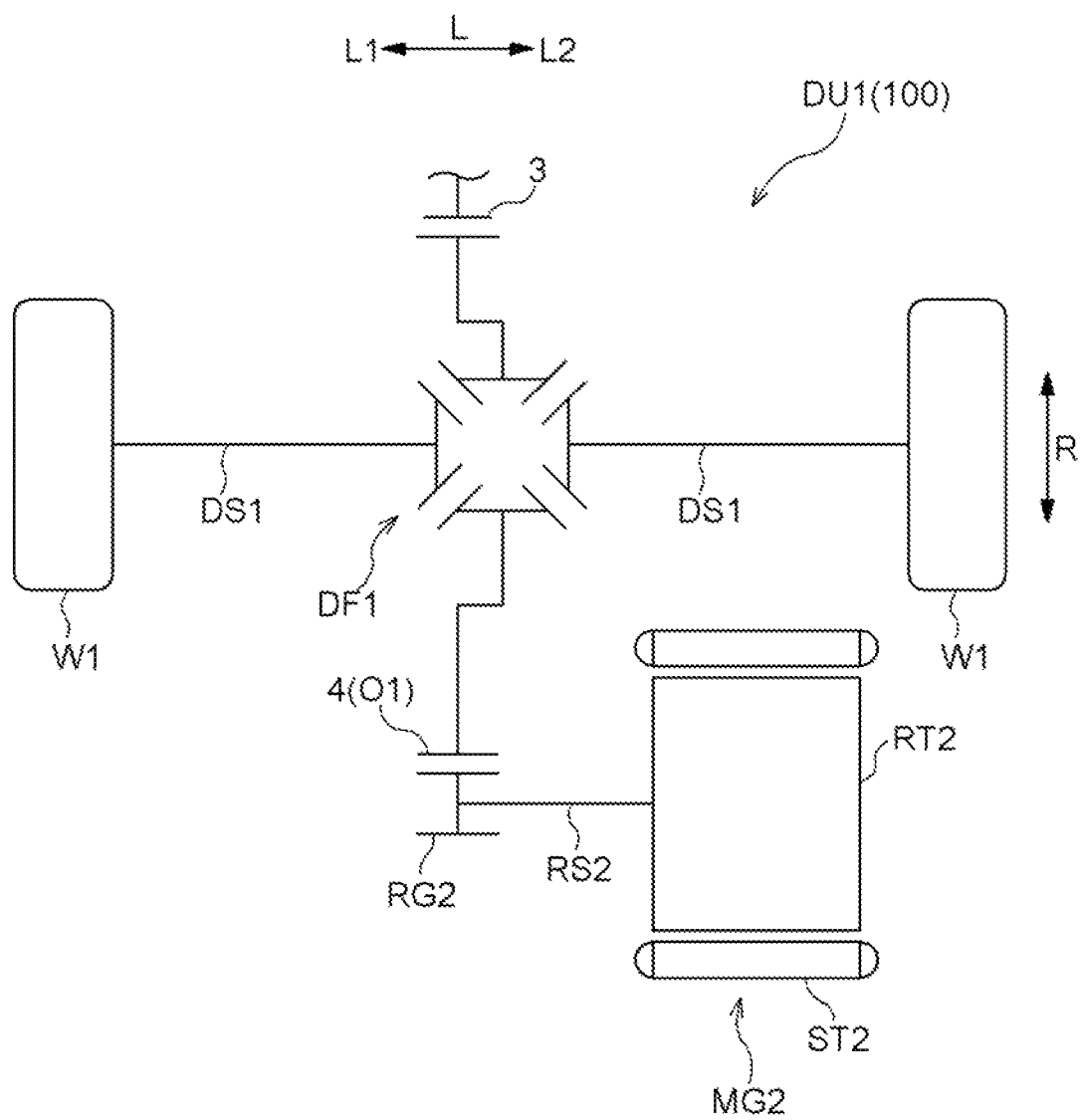
FIG. 20 is a skeleton diagram of a first drive unit of a vehicle drive device according to another embodiment.

3. Other Embodiments (1) In the above embodiments, as an example, the configuration has been described in which the vehicle drive device 100 includes the first drive unit DU1 and the second drive unit DU2. However, the present disclosure is not limited to such a configuration, and a configuration may be made in which the vehicle drive device 100 includes the first drive unit DU1 and does not include the second drive unit DU2. In this case, as shown in FIG. 20, the first drive unit DU1 may include the second rotary electric machine MG2. In the example shown in FIG. 20, the second rotor gear RG2 that rotates together with the second rotor RT2 of the second rotary electric machine MG2 meshes with the first differential input gear 4 serving as the first output member O1, at a position different from the position at which the transmission output gear 3 meshes with the first differential input gear 4 in a circumferential direction of the first differential input gear 4. In addition, although not shown, a configuration may be made in which the second rotor gear RG2 meshes with the transmission output gear 3. In these configurations, the second rotary electric machine MG2 is drivingly coupled to the first output member O1 on the first output member O1 side with respect to the third engagement device CL3 in the power transmission path between the second rotary element E2 of the distribution differential gear mechanism SP and the first output member O1. Note that a configuration may be made in which the vehicle drive device 100 does not include the second rotary electric machine MG2.

(2) In the above embodiments, as an example, the configuration has been described in which the operation mode of the vehicle drive device 100 implemented when the first engagement device CL1 is in an engaged state and the second engagement device CL2 is in a disengaged state (the second mode) is the electric torque converter mode (eTC mode) described above. However, the present disclosure is not limited to such a configuration. For example, the distribution differential gear mechanism SP may have a configuration through which a so-called split hybrid mode is implemented when the first engagement device CL1 is in an engaged state and the second engagement device CL2 is in a disengaged state. Here, the split hybrid mode is a mode in which torque of the internal combustion engine EG is distributed to the first rotary electric machine MG1 side and the first output member O1 side (transmission mechanism T side) to transmit, to the first output member O1 side, torque attenuated with respect to the torque of the internal combustion engine EG by using torque of the first rotary electric machine MG1 as a reaction force. In this case, the order of rotational speed of the rotary elements of the distribution differential gear mechanism SP may be the second rotary element E2, the first rotary element E1, and the third rotary element E3. For example, when the distribution differential gear mechanism SP is configured as a single-pinion-type planetary gear mechanism, a sun gear can be configured as the third rotary element E3 to be drivingly coupled to the first rotor RT1, a carrier can be configured as the first rotary element E1 to be drivingly coupled to the input member I, and a ring gear can be configured as the second rotary element E2 to be set as an output element of the distribution differential gear mechanism SP. In this mode, the first rotary electric machine MG1 outputs negative torque while positively rotating to generate electric power, and the distribution differential gear mechanism SP outputs the torque of the internal combustion engine EG from the second rotary element E2 by using the torque of the first rotary electric machine MG1 as a reaction force. Then, the rotation of the second rotary element E2 is transmitted to the first output member O1 via the transmission mechanism T.

(3) In the above embodiments, as an example, the configuration has been described in which the transmission mechanism T is a transmission that can form any of the two shift speeds, that is, the first shift speed (low speed) and the second shift speed (high speed). However, the present disclosure is not limited to such a configuration, and the transmission mechanism T may be a transmission that can form any of three or more shift speeds. Alternatively, the transmission mechanism T may be a transmission with a fixed transmission gear ratio (a speed reducer or a speed increaser) that changes a speed of rotation transmitted from the second rotary element E2 of the distribution differential gear mechanism SP at a fixed transmission gear ratio.

(4) In the above embodiments, as an example, the configuration has been described in which the transmission mechanism T is a parallel-axis-gear-type transmission. However, the present disclosure is not limited to such a configuration, and the transmission mechanism T may be configured as a planetary-gear-type transmission.

(5) In the above embodiments, as an example, the configuration has been described where, while the first transition control is performed, the drive power compensation control is performed in which the second rotary electric machine MG2 is caused to output drive power to compensate for the fluctuation in drive power, from the first rotary electric machine MG1 and the internal combustion engine EG, transmitted to the first output member O1 via the transmission mechanism T. However, the present disclosure is not limited to such a configuration, and a configuration may be made in which the drive power compensation control is not performed. In this case, the first transition control may be always performed, when transition is performed from the first mode to the second mode, without selectively performing the first transition control and the second transition control, in accordance with a state of the second rotary electric machine MG2.

(6) In the above embodiments, as an example, the configuration has been described in which the first engagement device CL1 is a friction engagement device and the second engagement device CL2 is a meshing-type engagement device. However, the present disclosure is not limited to such a configuration, and for example, the second engagement device CL2 may be a friction engagement device. Further, in the second embodiment, it is not necessary to bring the first engagement device CL1 into a slip engaged state in the first transition control, and thus the first engagement device CL1 may be a meshing-type engagement device.

(7) Note that the configuration disclosed in each of the embodiments described above can also be applied in combination with the configuration disclosed in any other embodiment unless any contradiction occurs. Regarding other configurations, the embodiments disclosed herein are merely illustrative in all respects. Therefore, various modifications can be appropriately made without departing from the gist of the present disclosure.

Outline of Above Embodiments

Hereinafter, the outline will be described for the vehicle drive device (100) described above.

A vehicle drive device (100) includes:
an input member (I) drivingly coupled to an internal combustion engine (EG);
a first output member (O1) drivingly coupled to a first wheel (W1);
a first rotary electric machine (MG1) including a rotor (RT1);
a distribution differential gear mechanism (SP) including a first rotary element (E1), a second rotary element (E2), and a third rotary element (E3), the first rotary element (E1) being drivingly coupled to the input member (I), the third rotary element (E3) being drivingly coupled to the rotor (RT1);
a transmission mechanism (T) that performs at least power transmission between the second rotary element (E2) and the first output member (O1);
a first engagement device (CL1) that connects and disconnects power transmission between the input member (I) and the first rotary element (E1);
a second engagement device (CL2) that connects and disconnects power transmission between two rotary elements selected from among three rotary elements that are the first rotary element (E1), the second rotary element (E2), and the third rotary element (E3); and
a control device (10) that controls the internal combustion engine (EG), the first rotary electric machine (MG1), the first engagement device (CL1), and the second engagement device (CL2),
the transmission mechanism (T) including a third engagement device (CL3) that connects and disconnects the power transmission between the second rotary element (E2) and the first output member (O1),
in which
the vehicle drive device (100) has a first mode and a second mode as operation modes,
in the first mode, the first engagement device (CL1) is brought into a disengaged state, the second engagement device (CL2) is brought into an engaged state, the third engagement device (CL3) is brought into an engaged state, and the internal combustion engine (EG) is brought into a stopped state of not outputting drive power, and drive power of the first rotary electric machine (MG1) is transmitted to the first output member (O1), in the second mode, the first engagement device (CL1) is brought into an engaged state, the second engagement device (CL2) is brought into a disengaged state, and the third engagement device (CL3) is brought into an engaged state, and drive power of the internal combustion engine (EG) and the first rotary electric machine (MG1) is transmitted to the first output member (O1), the control device (10) is allowed to perform first transition control when transition to the second mode from the first mode is performed, and the first transition control includes:

first control in which the second engagement device (CL2) is changed from an engaged state to a disengaged state while the third engagement device (CL3) is maintained in an engaged state;

second control in which, after the first control, a rotational speed of the rotor (RT1) is controlled to cause a rotational speed of the first rotary element (E1) to approach a target rotational speed (Nt); and third control in which, after the second control, the first engagement device (CL1) is changed from a disengaged state to an engaged state and the internal combustion engine (EG) is started by using drive power transmitted from the first rotary electric machine (MG1) to the internal combustion engine (EG) via the first engagement device (CL1).

According to this configuration, the relationship among the rotational speeds of the three rotary elements (E1 to E3) of the distribution differential gear mechanism (SP) can be freely changed by bringing the second engagement device (CL2) into a disengaged state, and utilizing this allows the rotational speed of the first rotary element (E1) of the distribution differential gear mechanism (SP) to easily approach the target rotational speed (Nt) by performing the rotational speed control of the first rotary electric machine (MG1), without bringing the third engagement device (CL3) into a disengaged state. As a result, the rotational speed of the first rotary element (E1) can be easily changed to a rotational speed required for starting the internal combustion engine (EG). In addition, after the rotational speed of the first rotary element (E1) is caused to approach the target rotational speed (Nt), bringing the first engagement device (CL1) into an engaged state allows a state in which the drive power of the first rotary electric machine (MG1) is transmittable to the internal combustion engine (EG), whereby the internal combustion engine (EG) can be started by using the drive power of the first rotary electric machine (MG1). After the start of the internal combustion engine (EG), the first engagement device (CL1) is in an engaged state, the second engagement device (CL2) is in a disengaged state, and the third engagement device (CL3) is in an engaged state. Thus, the second mode can be started without changing the states of the engagement devices (CL1 to CL3). Therefore, according to this configuration, it is possible to reduce a time required for the transition from the first mode to the second mode, that is, the transition of the operation modes accompanying the start of the internal combustion engine (EG).

Here, preferably, the first engagement device (CL1) is a friction engagement device including a direct-coupling engaged state and a slip engaged state as engaged states, the target rotational speed (Nt) is a rotational speed of the first rotary element (E1) determined based on a rotational speed of the internal combustion engine (EG) for the internal combustion engine (EG) to output drive power to be required after transition to the second mode, and in the third control, during an engagement operation in which the first engagement device (CL1) is changed from a disengaged state to a direct-coupling engaged state through a slip engaged state, the control device (10) causes a rotational speed of the internal combustion engine (EG) to increase to start the internal combustion engine (EG), by using drive power transmitted from the first rotary electric machine (MG1) to the internal combustion engine (EG) via the first engagement device (CL1) in a slip engaged state.

According to this configuration, with the first engagement device (CL1) in a disengaged state, the rotational speed of the first rotary electric machine (MG1) is controlled such that the rotational speed of the first rotary element (E1) approaches the target rotational speed (Nt) determined based on the rotational speed of the internal combustion engine (EG) for the internal combustion engine (EG) to output the drive power to be required after the transition to the second mode. Then, during the engagement operation of the first engagement device (CL1), the internal combustion engine (EG) is started by using the drive power of the first rotary electric machine (MG1) transmitted to the internal combustion engine (EG) via the first engagement device (CL1) in a slip engaged state. As a result, it is possible to reduce the number of times of controlling the rotational speed of the first rotary electric machine (MG1), during the transition from the first mode to the second mode. In addition, the rotational speed of the first rotary electric machine (MG1) can be controlled in a state where power transmission between the internal combustion engine (EG) and the first rotary electric machine (MG1) is cut off and inertia is small, and thus the rotational speed of the first rotary element (E1) is allowed to quickly approach the target rotational speed (Nt). Therefore, according to this configuration, it is possible to further reduce the time required for the transition from the first mode to the second mode.

Further, preferably, the target rotational speed (Nt) is zero, a rotational speed of the first rotary element (E1) determined based on a rotational speed of the internal combustion engine (EG) for the internal combustion engine (EG) to output drive power to be required after transition to the second mode is set as a post-transition target rotational speed (Nta), and in the third control, after the first engagement device (CL1) is changed from a disengaged state to a direct-coupling engaged state, the control device (10) controls the rotational speed of the rotor (RT1) to cause the rotational speed of the first rotary element (E1) to approach the post-transition target rotational speed (Nta), and causes a rotational speed of the internal combustion engine (EG) to increase to start the internal combustion engine (EG), by using drive power transmitted from the first rotary electric machine (MG1) to the internal combustion engine (EG) via the first engagement device (CL1) in a direct-coupling engaged state.

According to this configuration, when the internal combustion engine (EG) is started, the rotational speed of the first rotary element (E1) is controlled to approach zero, which is the same value as the rotational speed of the internal combustion engine (EG), then the first engagement device (CL1) is brought into a direct-coupling engaged state, and the rotational speed of the first rotary element (E1) is increased to correspond to the post-transition target rotational speed (Nta), thereby starting the internal combustion engine (EG) using the drive power of the first rotary electric machine (MG1). That is, it is not necessary to bring the first engagement device (CL1) into a slip engaged state when the internal combustion engine (EG) is started. This facilitates simplification of the structure and reduction in cost of the first engagement device (CL1). In addition, it is possible to reduce loss of energy consumed by being converted into heat in the first engagement device (CL1), and thus it is possible to enhance energy efficiency of the vehicle drive device (100).

Further, preferably, a second rotary electric machine (MG2) is further provided that is drivingly coupled to, not via the first output member (O1), a second output member (O2) drivingly coupled to a second wheel (W2) different from the first wheel (W1), or that is drivingly coupled to the first output member (O1) on a side of the first output member (O1) with respect to the third engagement device (CL3) in a power transmission path between the second rotary element (E2) and the first output member (O1), and while the first transition control is performed, the control device (10) performs drive power compensation control in which the second rotary electric machine (MG2) is caused to output drive power to compensate for fluctuation in drive power, from the first rotary electric machine (MG1) and the internal combustion engine (EG), transmitted to the first output member (O1) via the transmission mechanism (T).

According to this configuration, it is possible to reduce fluctuation in drive power in the entire vehicle, during the transition from the first mode to the second mode.

In a configuration including the second rotary electric machine (MG2), preferably, the control device (10) is allowed to selectively perform the first transition control and second transition control when transition to the second mode from the first mode is performed, the second transition control includes:
fourth control in which the third engagement device (CL3) is changed from an engaged state to a disengaged state while the second engagement device (CL2) is maintained in an engaged state;
fifth control in which, after the fourth control, the rotational speed of the rotor (RT1) is controlled to cause the rotational speed of the first rotary element (E1) to approach the target rotational speed (Nt);
sixth control in which, after the fifth control, the first engagement device (CL1) is changed from a disengaged state to an engaged state and the internal combustion engine (EG) is started by using drive power transmitted from the first rotary electric machine (MG1) to the internal combustion engine (EG) via the first engagement device (CL1); and
seventh control in which, after the sixth control, the third engagement device (CL3) is changed from a disengaged state to an engaged state and the second engagement device (CL2) is changed from an engaged state to a disengaged state, and the control device (10) performs the first transition control when surplus drive power (Ts) that is a difference between drive power being output by the second rotary electric machine (MG2) and upper-limit drive power outputtable by the second rotary electric machine (MG2) is equal to or larger than required drive power (Tn) that is drive power required for performing the drive power compensation control, and performs the second transition control when the surplus drive power (Ts) is smaller than the required drive power (Tn).

According to this configuration, in the second transition control, the internal combustion engine (EG) is started by using the drive power transmitted from the first rotary electric machine (MG1) to the internal combustion engine (EG) via the first engagement device (CL1), while the third engagement device (CL3), which connects and disconnects the power transmission between the second rotary element (E2) of the distribution differential gear mechanism (SP) and the first output member (O1), is in a disengaged state. This can prevent fluctuation in drive power of the first rotary electric machine (MG1), the internal combustion engine (EG), and the like while the second transition control is performed from being transmitted to the first output member (O1). Thus, while the second transition control is performed, it is possible to reduce fluctuation in drive power in the entire vehicle, even when the drive power compensation control is not performed.

In addition, according to this configuration, when the surplus drive power (Ts) is equal to or larger than the required drive power (Tn), the first transition control including the drive power compensation control is performed. On the other hand, when the surplus drive power (Ts) is smaller than the required drive power (Tn), the second transition control not including the drive power compensation control is performed. As a result, even when the drive power required for performing the drive power compensation control does not remain in the second rotary electric machine (MG2), the second transition control that does not require the drive power compensation control can be performed. Thus, regardless of the state of the second rotary electric machine (MG2), it is possible to reduce fluctuation in drive power in the entire vehicle.

INDUSTRIAL APPLICABILITY

The technique according to the present disclosure can be used in a vehicle drive device including an input member drivingly coupled to an internal combustion engine, an output member drivingly coupled to a wheel, a rotary electric machine, and a distribution differential gear mechanism.

REFERENCE SIGNS LIST

00: Vehicle drive device, 10: Control device, I: Input member, O1: First output member, MG1: First rotary electric machine, RT1: First rotor (rotor), SP: Distribution differential gear mechanism, E1: First rotary element, E2: Second rotary element, E3: Third rotary element, T: Transmission mechanism, CL1: First engagement device, CL2: Second engagement device, CL3: Third engagement device, EG: Internal combustion engine, and W1: First wheel

The invention claimed is:
1. A vehicle drive device comprising:
an input member drivingly coupled to an internal combustion engine;
a first output member drivingly coupled to a first wheel;
a first rotary electric machine including a rotor;
a distribution differential gear mechanism including a first rotary element, a second rotary element, and a third rotary element, the first rotary element being drivingly coupled to the input member, the third rotary element being drivingly coupled to the rotor;
a transmission mechanism that performs at least power transmission between the second rotary element and the first output member;
a first engagement device that connects and disconnects power transmission between the input member and the first rotary element;

a second engagement device that connects and disconnects power transmission between two rotary elements selected from among three rotary elements that are the first rotary element, the second rotary element, and the third rotary element; and a control device that controls the internal combustion engine, the first rotary electric machine, the first engagement device, and the second engagement device, the transmission mechanism including a third engagement device that connects and disconnects the power transmission between the second rotary element and the first output member, wherein the vehicle drive device has a first mode and a second mode as operation modes, in the first mode, the first engagement device is brought into a disengaged state, the second engagement device is brought into an engaged state, the third engagement device is brought into an engaged state, and the internal combustion engine is brought into a stopped state of not outputting drive power, and drive power of the first rotary electric machine is transmitted to the first output member, in the second mode, the first engagement device is brought into an engaged state, the second engagement device is brought into a disengaged state, and the third engagement device is brought into an engaged state, and drive power of the internal combustion engine and the first rotary electric machine is transmitted to the first output member, the control device is allowed to perform a first transition control when transition to the second mode from the first mode is performed, and the first transition control includes:

a first control in which the second engagement device is changed from an engaged state to a disengaged state while the third engagement device is maintained in an engaged state;

a second control in which, after the first control, a rotational speed of the rotor is controlled to cause a rotational speed of the first rotary element to approach a target rotational speed; and a third control in which, after the second control, the first engagement device is changed from a disengaged state to an engaged state and the internal combustion engine is started by using drive power transmitted from the first rotary electric machine to the internal combustion engine via the first engagement device.

2. The vehicle drive device according to claim 1, wherein the first engagement device is a friction engagement device including a direct-coupling engaged state and a slip engaged state as engaged states, wherein the target rotational speed is the rotational speed of the first rotary element determined based on a rotational speed of the internal combustion engine for the internal combustion engine to output drive power to be required after transition to the second mode, and wherein, in the third control, during an engagement operation in which the first engagement device is changed from the disengaged state to the direct-coupling engaged state through the slip engaged state, the control device causes the rotational speed of the internal combustion engine to increase to start the internal combustion engine, by using drive power transmitted from the first rotary electric machine to the internal combustion engine via the first engagement device in the slip engaged state.

3. The vehicle drive device according to claim 1, wherein the target rotational speed is zero, wherein the rotational speed of the first rotary element determined based on the rotational speed of the internal combustion engine for the internal combustion engine to output drive power to be required after transition to the second mode is set as a post-transition target rotational speed, and wherein, in the third control, after the first engagement device is changed from a disengaged state to a direct-coupling engaged state, the control device controls the rotational speed of the rotor to cause the rotational speed of the first rotary element to approach the post-transition target rotational speed, and causes a rotational speed of the internal combustion engine to increase to start the internal combustion engine, by using drive power transmitted from the first rotary electric machine to the internal combustion engine via the first engagement device in the direct-coupling engaged state.

4. The vehicle drive device according to claim 1, further comprising a second rotary electric machine that is drivingly coupled to, not via the first output member, a second output member drivingly coupled to a second wheel different from the first wheel, or that is drivingly coupled to the first output member on a side of the first output member with respect to the third engagement device in a power transmission path between the second rotary element and the first output member, wherein while the first transition control is performed, the control device performs drive power compensation control in which the second rotary electric machine is caused to output drive power to compensate for fluctuation in drive power, from the first rotary electric machine and the internal combustion engine, transmitted to the first output member via the transmission mechanism.

5. The vehicle drive device according to claim 4, wherein the control device is allowed to selectively perform the first transition control and a second transition control when transition to the second mode from the first mode is performed, wherein the second transition control includes:

a fourth control in which the third engagement device is changed from an engaged state to a disengaged state while the second engagement device is maintained in an engaged state;

a fifth control in which, after the fourth control, the rotational speed of the rotor is controlled to cause the rotational speed of the first rotary element to approach the target rotational speed;

a sixth control in which, after the fifth control, the first engagement device is changed from a disengaged state to an engaged state and the internal combustion engine is started by using drive power transmitted from the first rotary electric machine to the internal combustion engine via the first engagement device; and a seventh control in which, after the sixth control, the third engagement device is changed from a disengaged state to an engaged state and the second engagement device is changed from an engaged state to a disengaged state, and wherein the control device performs the first transition control when surplus drive power that is a difference between drive power being output by the second rotary electric machine and upper-limit drive power outputtable by the second rotary electric machine is equal to or larger than required drive power that is drive power required for performing the drive power compensation control, and performs the second transition control when the surplus drive power is smaller than the required drive power.

* * * * *